(12) United States Patent
Nakazato et al.

(10) Patent No.: US 9,150,241 B2
(45) Date of Patent: Oct. 6, 2015

(54) TILT STEERING APPARATUS

(71) Applicant: NSK Ltd., Tokyo (JP)

(72) Inventors: Youhei Nakazato, Gunma (JP); Kou Yamamoto, Gunma (JP); Noritomo Narita, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/355,314

(22) PCT Filed: Jul. 10, 2013

(86) PCT No.: PCT/JP2013/068903
§ 371 (c)(1),
(2) Date: Apr. 30, 2014

(87) PCT Pub. No.: WO2014/010641
PCT Pub. Date: Jan. 16, 2014

(65) Prior Publication Data
US 2014/0284909 A1    Sep. 25, 2014

(30) Foreign Application Priority Data

Jul. 12, 2012  (JP) .................................. 2012-156115
Mar. 4, 2013   (JP) .................................. 2013-041691
Mar. 4, 2013   (JP) .................................. 2013-041692

(51) Int. Cl.
*B62D 1/187*  (2006.01)
*B62D 1/184*  (2006.01)

(52) U.S. Cl.
CPC ................ *B62D 1/187* (2013.01); *B62D 1/184* (2013.01)

(58) Field of Classification Search
CPC ................................ B62D 1/187; B62D 1/184
See application file for complete search history.

(56) References Cited

U.S. PATENT DOCUMENTS

| 5,301,567 A *   | 4/1994  | Snell et al. ...................... 74/493 |
| 7,717,011 B2 *  | 5/2010  | Hirooka ......................... 74/493 |
| 8,677,856 B2 *  | 3/2014  | Okada et al. ..................... 74/493 |
| 2004/0061322 A1*| 4/2004  | D'Agostino et al. .......... 280/775 |
| 2009/0241721 A1 | 10/2009 | Inoue et al. |
| 2009/0267336 A1*| 10/2009 | Streng et al. .................. 280/775 |
| 2009/0272219 A1*| 11/2009 | Okada et al. .................... 74/493 |

(Continued)

FOREIGN PATENT DOCUMENTS

| JP | 2008-0307959 | 12/2008 |
| JP | 2009-0255848 | 11/2009 |
| JP | 2010-0069946 | 4/2010  |

(Continued)

*Primary Examiner* — Drew Brown
(74) *Attorney, Agent, or Firm* — Hartman Global IP Law; Gary M. Hartman; Domenica N. S. Hartman

(57) ABSTRACT

Construction of a tilt steering apparatus is provided that is capable of preventing the occurrence of unpleasant noise during height adjustment of a steering wheel 1, and maintains sufficient durability and smooth operation. The tilt steering apparatus of the present invention is provided with stoppers 65 in at least two locations in a buffer member 21 c that are rotationally symmetric about the center axis of an adjustment rod 14, and that when a driven-side cam 15*b* is rotated as the axial dimension of a cam apparatus 47 is expanded or contracted, controls rotation of the driven-side cam 15*b* so that a convex engaging portion 39*c* does not collide with the front-side edge or rear-side edge of a vertically long hole 35*b*.

9 Claims, 18 Drawing Sheets

(56) References Cited

U.S. PATENT DOCUMENTS

2012/0080873 A1    4/2012    Narita et al.
2012/0080874 A1    4/2012    Narita et al.
2012/0266715 A1   10/2012   Okada et al.

FOREIGN PATENT DOCUMENTS

| | | |
|---|---|---|
| JP | 2012-0040904 | 3/2012 |
| JP | 2012-0040949 | 3/2012 |
| WO | WO2012011424 A1 * | 1/2012 |

* cited by examiner

TILT STEERING APPARATUS

TECHNICAL FIELD

The present invention relates to a tilt steering apparatus that is provided with a tilt mechanism to adjust the height position of a steering wheel according to the physique and driving posture of a driver.

BACKGROUND ART

As illustrated in FIG. 13, a steering apparatus for an automobile is constructed such that the rotation of a steering wheel 1 is transmitted to an input shaft 3 of a steering unit 2, and as the input shaft 3 rotates, a pair of tie rods 4 are pushed and pulled, which applies a steering angle to the front wheels. The steering wheel 1 is supported by and fastened to the rear-end portion of a steering shaft 5, and that steering shaft 5 is inserted in the axial direction into a steering column 6 having a cylindrical shape, and is supported by the steering column 6 so as to be able to rotate freely. Moreover, the front-end portion of the steering shaft 5 is connected to the rear-end portion of an intermediate shaft 8 by way of a universal joint 7, and the front-end portion of the intermediate shaft 8 is connected to the input shaft 3 by way of another universal joint 9. In the construction illustrated in FIG. 13, an electric power steering apparatus is provided, and the front-end portion of the steering column 6 supports an electric motor 10 and is connected to a housing 11 that houses a reducer. Here, the forward-backward direction, the left-right direction (width direction) and the up-down direction, unless specified otherwise, refer to the forward-backward direction, left-right direction (width direction) and up-down direction of a vehicle body in which the tilt steering apparatus is installed.

In a steering apparatus for an automobile, a tilt mechanism to adjust the height position of the steering wheel 1 is normally assembled. A tilt steering apparatus, in which a manual tilt mechanism is installed, is constructed so as to be able to change between an adjustable state in which the height position of the steering wheel 1 is adjustable according to the operation of an adjustment lever (not illustrated), and a state in which the adjusted height of the steering wheel 1 is maintained. In this kind of tilt steering apparatus, a cam mechanism is assembled so as to improve the operational feeling of the adjustment lever, or a gear engaging means are installed in the tilt mechanism to strongly maintain the height position of the steering wheel 1.

Various kinds of construction are known for a tilt steering apparatus in which this kind of manual tilt mechanism is assembled, and FIG. 14 to FIG. 18 illustrate the construction as disclosed in JP 2012-040949 (A). This tilt steering apparatus has: a steering column 6a, a steering shaft 5a, a displacement-side bracket 12, a fixed-side bracket 13, an adjustment rod 14, a driven-side cam 15, a drive-side cam 16, an adjustment lever 17, a receiving bracket 18, a pivot arm 19, a pivot transmission portion 20, and buffer members 21a, 21b.

In the illustrated construction, in addition to a tilt mechanism to adjust the height position of the steering wheel 1, a telescopic function to adjust the forward-backward position is also provided. In order to achieve this telescopic function, the steering column 6a is constructed such that the front portion of an inner column that is located on the rear side is fitted inside an outer column 22 that is located on the front side, so that the overall length of the steering column 6a can be expanded or contracted. The outer column 22 is formed into a U shape that is open on the top by bending metal plate, and restraining blocks 24 are fastened to the inside surfaces on the upper side of each. The front portion of the inner column 23 is fitted inside a portion that is surrounded by the restraining blocks 24 and the bottom surface of the outer column 22 so as to be able to be displaced in the axial direction. Moreover, the front-end portion of the outer column 22 is joined and connected to a housing 25 of a power steering apparatus in a state so as to protrude toward the rear from the housing 25. Furthermore, a support tube 26 is supported by and fastened to the front top portion of the housing 25, and the housing 25 and steering column 6a are supported by the vehicle body by way of a tilt shaft (not illustrated) that is inserted through the support tube 26 so as to be able to be pivotally displaced.

The steering shaft 5a is constructed by fitting the rear portion of the inner shaft 27, that is located in the front side, with the front portion of the outer shaft 28 that is located in the rear side by a spline fit so as to be able to transmit torque, and the steering shaft 5a expands or contracts as the steering column 6a expands or contracts. The steering shaft 5a is such that the rear-end portion protrudes toward the rear from the opening on the rear end of the steering column 6a, and supported on the inside of the steering column 6a so as to be able to rotate freely. In order for this, the portion near the rear end of the intermediate portion of the outer shaft 28 is supported on the inside of the rear-end portion of the inner column 23 by a bearing such as a single-row deep-groove ball bearing that supports radial loads and thrust loads. Moreover, the output shaft 29 of the power steering apparatus is joined and fastened to the front-end portion of the inner shaft 27 by way of a torsion bar, and the output shaft 29 is supported on the inside of the housing 25 by a similar ball bearing. The steering wheel 1 is fastened to the rear-end portion of the outer shaft 28.

The displacement-side bracket 12 is constructed by the upper section of a pair of left and right side plate portions 30 of the outer column 22, and the retaining block 24 that is fastened to the inside surface on the upper side of these side-plate portions 30. Through holes 32 for inserting the rod portion 31 of the adjustment rod 14 are formed in the portions in the side plate portions 30 and restraining block 24 that are aligned with each other.

The fixed-side bracket 13 is formed by bending using press working or by die cast molding of a metal such as a steel plate or an aluminum alloy, and has: an installation plate portion 33 for supporting and fastening the fixed-side bracket 13 to the vehicle body, and a pair of support plate portions 34a, 34b for supporting the displacement-side bracket 12 with respect to the fixed-side bracket 13. The pair of support plate portions 34a, 34b are provided so as to be parallel with each other in a state separated in the width direction and hanging down from the installation plate portion 33 so as to hold the displacement-side bracket 12 from both sides in the width direction. Vertically long holes 35a, 35b having a partial arc shape that is centered around the tilt shaft are formed in portions of the pair of support plate portions 34a, 34b that are aligned with each other.

The adjustment rod 14 is such that an outward-facing flange shaped anchor portion 37 is fastened to the base-end portion of the round rod shaped rod portion 31, and a male screw portion 38 is formed on the tip-end portion thereof. A convex engaging portion 39a that extends in the up-down direction is provided in a portion on the inside surface of the anchor portion 37 that surrounds the base-end portion of the rod portion 31. The convex engaging portion 39a is such that the width dimension in the forward-backward direction is slightly smaller than the width dimension in the forward-backward direction of the vertically long hole 35a that is provided in one of the support plate portions 34a, and the length dimension in the up-down direction is longer than the width dimension in the forward-backward direction of the vertically long hole 35a. The rod portion 31 of the adjustment rod 14 is inserted in the width direction through the vertically long holes 35a, 35b, and the through holes 32, and engages with the vertically long hole 35a of the one support plate portion 34a, and the inside surface of the anchor portion 37 comes in contact with the outside surface of the one support plate portion 34a. In this state, the male screw portion 38 of the rod portion 31 protrudes from the outside surface of the other support plate portion 34b. A buffer member 21a is fitted around the outside of the base-end portion of the rod portion 31. The buffer member 21a is made of synthetic resin and has a shape that covers both end surfaces on the top and bottom of the convex engaging portion 39a. In other words, a circular hole 40a for inserting the rod portion 31 through is provided in the center portion of the buffer member 21a, and buffer portions 41a are provided at both end portions on the top and bottom of the outside surface of the buffer member 21a. When the rod portion 31 is inserted through the circular hole 40a up to the base-end portion, both end surfaces of the top and bottom of the convex engaging portion 39a are covered by the top and bottom buffer portions 41a.

The driven-side cam 15 is formed by forging a metal material such as an iron-based alloy or by performing the necessary finishing of a sintered metal that was obtained by powder metallurgy, so as to have the required strength, rigidity and resistance to wear, and a convex engaging portion 39b is provided on the inside surface, a driven-side cam surface 42 is provided on the outside surface, and a through hole 43a that passes through in the axial direction is provided in the center portion thereof. The convex engaging portion 39b, as in the case of the convex engaging portion 39a that is formed on the inside surface of the anchor portion 37, has a width dimension in the forward-backward direction that is slightly smaller than the width dimension in the forward-backward direction of the vertically long hole 35b that is provided in the other support plate portion 34b, and has a length dimension in the up-down direction that is larger than the width dimension in the forward-backward direction of the vertically long hole 35b. The buffer member 21b, as in the case of the buffer member 21a, has a circular hole 40b and a pair of buffer portions 41b, where in a state in which these buffer portions 41b cover both end surfaces on the top and bottom of the convex engaging portion 39b, being mounted to the inside surface of the driven-side cam 15, and being fitted around the outside of the portion near the tip end of the intermediate portion of the rod portion 31 of the adjustment rod 14. Moreover, the driven-side cam surface 42 is constructed such that an uneven surface is formed in the circumferential direction by making a convex portion, an inclined surface that is continuous in the circumferential direction with this convex portion, and a concave portion that is continuous in the circumferential direction of the inclined surface. Furthermore, the shape as seen from the axial direction of the through hole 43a is an elliptical shape. The tip-end portions of hook-shaped pieces 51 that protrude from both end portions in the width direction (forward-backward direction) of the center portions in the up-down direction of the outside surface of the buffer member 21b are engaged with the end edge portions of the driven-side cam surface 42 on both sides in the major axis direction of the through hole 43a, which prevents the driven-side cam 15 from coming apart from the buffer member 21b.

The drive-side cam 16 is formed in the same way as the driven-side cam 15, with a drive-side cam surface 44 being provided on the inside surface thereof, and a circular through hole 43b that passes through in the axial direction being provided in the center portion thereof. The drive-side cam 16 is supported by the tip-end portion of the adjustment rod 14 in a state so as to be able to rotate centered around the adjustment rod 14, and such that displacement toward the tip-end side of the adjustment rod 14 is prevented. In order for this, a nut 45 is screwed onto the male screw portion 38 on the tip-end portion of the adjustment rod 14, and a thrust bearing 46 is placed between the inside surface of the nut 45 and the outside surface of the drive-side cam 16. The nut 45 is tightened to a specified torque, and then by crimping part (the outside end portion, for example) in the direction of the male screw portion 38, the nut 45 is prevented from becoming loose. By the drive-side cam surface 44 of the drive-side cam 16 engaging with the driven-side cam surface 42 of the driven-side cam 15, a cam apparatus 47 is formed that expands or contracts the dimension in the axial direction, or in other words, the distance in the axial direction between the outside surface of the drive-side cam 16 and the inside surface of the driven-side cam 15.

The adjustment lever 17 is formed by injection molding of synthetic resin that includes a high-function resin such as a polyamide or polyacetal, or is formed by die cast molding of a light alloy such as an aluminum alloy, and a concave holding portion 48 is provided in the base-end portion thereof. The drive-side cam 16 is held inside the concave holding portion 48 in a state in which relative rotation with respect to the concave holding portion 48 is prevented such that the adjustment lever 17 is able to rotate and drive the drive-side cam 16. An opening portion is provided in the bottom portion of the concave holding portion 48, which allows the outside surface of the drive-side cam 16 to come in direct contact with the thrust bearing 46. Therefore, the drive-side cam 16 and the base-end portion of the adjustment lever 17, and the adjustment rod 14 and the nut 45 are capable of relative rotation.

The receiving bracket 18 is formed using a metal material that is able to maintain sufficient strength and rigidity, and being separated from the fixed-side bracket 13, is supported and fastened to the outside surface of the other support plate portion 34b by screws or the like. The receiving bracket 18 is open in the front and in both the top and bottom ends, and has a concave groove 49 that extends in a direction along the vertically long hole 35b. The concave groove 49 is formed into a V shape such that the width at the opening portion is wide, and is inclined becoming narrower going toward the bottom. A female gear 50, which has a rack tooth shape with respect to the up-down direction, is provided on the inside surface of both sides of the concave groove 49.

The pivot arm 19 is supported around the driven-side cam 15 such that relative rotation and a small amount of relative displacement in at least the up-down direction with respect to the driven-side cam 15 is possible. In order for this, a support hole 52 having an inner diameter that is slightly larger than the outer diameter of the driven-side cam 15 is provided on the base-end portion of the pivot arm 19. With the driven-side cam 15 located inside the support hole 52, a centering spring 53 is provided between the driven-side cam 15 and the base-end portion of the pivot arm 19. In a state in which there is no external force acting on the driven-side cam 15, the driven-side cam 15 is located in the center position in the up-down direction inside the support hole 52 due to the elastic force of the centering spring 53. A male gear 54 that can engage or disengage with the female gear 50 on the inside surface of the concave groove 49 is provided on both side surfaces of the tip-end portion of the pivot arm 19. The cross-sectional shape of the tip-end portion of the pivot arm 19 is a wedge shape, the thickness dimension of which becomes smaller going toward the tip edge of the portion where the male gear 54 is formed.

The pivot transmission portion 20 is provided between the adjustment lever 17 and the pivot arm 19 so as to rotate the pivot arm 19 centered around the adjustment rod 14 together with the adjustment lever 17. Specifically, a protrusion 55 that is formed in the portion near the tip end of the outside surface of the pivot arm 19 is caused to gently engage with an concave engaging portion that is formed in the inside surface of part of the adjustment lever 17. As a result, in a state in which the adjustment lever 17 is rotated upward and the dimension in the axial direction of the cam apparatus 47 is expanded, the female gear 50 and male gear 54 engage with each other, however, when in the state in which the adjustment lever 17 is rotated downward and the dimension in the axial dimension of the cam apparatus 47 is contracted, the female gear 50 and male gear 54 become disengaged.

In this kind of tilt steering apparatus, when adjusting the height position of the steering wheel 1, the adjustment lever 17 is rotated downward, which causes the convex portions of the drive-side cam surface 44 of the drive-side cam 16 of the cam apparatus 47 to face the concave portions of the driven-side cam surface 42 of the driven-side cam 15, and the dimension in the axial direction of the cam apparatus 47 is contracted. In this state, the surface pressure at the contact areas between the inside surfaces of the support plate portions 34a, 34b of the fixed-side bracket 13 and the outside surface of the outer column 22 of the steering column 6a is decreased or lost. Moreover, the female gear 50 and the male gear 54 become disengaged. Therefore, the height position of the steering wheel 1 is adjusted within the range in which the buffer members 21a, 21b can be displaced inside the vertically long holes 35a, 35b. During this adjustment work, when the steering wheel 1 is moved to the top-end position or bottom-end position of the adjustable range, the buffer portions 41a, 41b of the buffer members 21a, 21b that are made of synthetic resin come in contact with the top-end portion or bottom-end portion of the peripheral edge of the vertically long holes 35a, 35b. As a result, the occurrence of an impact or noise that is unpleasant for the driver that is operating the steering wheel 1 due to the impact between metal members is prevented. Moreover, in the example in the figures, when the dimension in the axial direction of the cam apparatus 47 is contracted, the surface pressure of the engaging portion between the outer column 22 and the inner column 23 is also decreased or lost, so by moving the inner column in the forward-backward direction, it is also possible to adjust the forward-backward position of the steering wheel 1.

After the steering wheel 1 has been moved to a desired position, the adjustment lever 17 is rotated upward, which causes the convex portions of the drive-side cam surface 44 and the driven-side cam surface 42 to come face to face with each other, and the dimension in the axial direction of the cam apparatus 47 expands. In this state, the surface pressure at the contact areas between the inside surfaces of the support plate portions 34a, 34b and the outside surface of the outer column 22 increases, and at the same time the surface pressure at the fitting portion between the outer column 22 and the inner column 23 also increases. Moreover, the female gear 50 and the male gear 54 engage. When the steering wheel 1 is moved to a desired position, and the adjustment lever 17 is simply rotated upward does not absolutely mean that female gear 50 and the male gear 54 will engage. In this case as well, the pivot arm 19 on which the male gear 54 is provided is displaced in the up-down direction with respect to the driven-side cam 15 while causing the centering spring 53 to elastically deform, which causes the female gear 50 and the male gear 54 to engage. As a result, the steering wheel 1 is maintained at the adjusted position. Even in the case of a secondary impact in which a large force is applied in a direction that causes the steering wheel 1 to rise, the large maintaining force due to the engagement between the female gear 50 and the male gear 54 prevents the steering wheel 1 from jumping up.

In the example in the figure, an elastic locking piece 57 that engages with a locking stepped portion 56 that is formed on the receiving bracket 18 when the adjustment lever is rotated upward is provided at the base-end portion of the adjustment lever 17. A sleeve 58 is provided inside the through hole 43b that is in the center of the drive-side cam 16. An energy absorbing member 59 is provided on the top surface of the inner column 23. FIG. 19 illustrates construction that is disclosed in WO 2012/011424 (A1), however, in this construction, part of the pivot arm 19 is covered by a first buffer plate 60 and a second buffer plate 61 made of synthetic resin.

In the case of this kind of tilt steering apparatus, the buffer members 21a, 21b lessen the impact that occurs when the top-end surfaces or bottom-end surfaces of the convex engaging portions 39a, 39b collide with the top-end surfaces or bottom-end surface of the peripheral edges of the vertically long holes 35a, 35b during up-down position adjustment of the steering wheel 1. The buffer portions 41a, 41b of the buffer members 21a, 21b cover both the top and bottom end surfaces of the convex engaging portions 39a, 39b, however, the center portion in the up-down direction of both side surfaces in the forward-backward direction of the convex engaging portions 39a, 39b are not recessed more than the buffer portions 41a, 41b and are exposed.

On the other hand, as illustrated in FIG. 20, minute gaps for allowing the convex engaging portions 39a, 39b and buffer members 21a, 21b to move smoothly along the vertically long holes 35a, 35b are provided between the front-side edge 62 and rear-side edge 63 of the vertically long holes 35a, 35b, and both side surfaces in the front and rear of the convex engaging portions 39a, 39b and both side surfaces in the front and rear of the buffer members 21a, 21b. Therefore, the convex engaging portions 39a, 39b and buffer members 21a, 21b can rotate centered around the adjustment rod 14 inside the vertically long holes 35a, 35b just the amount of the minute gaps. Therefore, when the drive-side cam 16 is rotated by the adjustment lever 17 in the tightening direction (direction that expands the dimension in the axial direction of the cam apparatus 47) after the position of the steering wheel 1 has been adjusted, the driven-side cam 15 having convex engaging portions 39b on the inside surface thereof also rotates in the same direction just the amount of the minute gap. Similarly, when the adjustment lever 17 is rotated in the opposite direction of the tightening direction, the driven-side cam 15 rotates in the same direction just the amount of this minute gap.

The vertically long holes 35a, 35b have a partial arc shape that is centered around the tilt shaft, so the front-side edges 62 of the peripheral edges of the vertically long holes 35a, 35b are convex arcs, and the rear-side edges 63 are concave arcs. Therefore, when the convex engaging portions 39a, 39b are pivotally displaced inside the vertically long holes 35a, 35b centered around the adjustment rod 14, there is a collision of the metal of the portions near both ends in the up-down direction of the side surfaces on the front side of the convex engaging portions 39a, 39b, and the front-side edges 62 of the vertically long holes 35a, 35b. Particularly, with regard to the convex engaging portion 39b that is formed on the inside surface of the driven-side cam 15, the amount of this collision can easily become severe. The reason for this is that due to the engagement between the inclined surfaces of the driven-side cam surface 42 and the drive-side cam surface 44 during the process of operating the adjustment lever 17, regardless of the intention of the driver that operates the adjustment lever 17, it is easy for the adjustment lever to rotate with much energy.

However, it is feasible to simply cause both end portions in the front and rear of the buffer portion 41b of the buffer member 21b to protrude toward the front and rear further than both side surfaces in the front and rear of the convex engaging portion 39b, such that only both end portions in the front and rear of the buffer portion 41b will come in contact with the edges 62, 63 on both the front and rear sides of the vertically long hole 35b in a pre-loaded state. In this construction, looseness in the direction of rotation between the convex engaging portions 39b and the buffer member 21b is eliminated, so the driver that operates the adjustment lever 17 does not experience a feeling of looseness, and it is possible to prevent collision between metal members. However, in this construction, the friction force that acts on the contact areas between the edges 62, 63 on both the front and rear sides of the vertically long hole 35b and both end portions in the front and rear of the buffer portion 41b becomes large. This friction force has an adverse effect on the smooth operation of adjustment of the height position of the steering wheel 1.

Moreover, in the case of this construction, it is difficult to sufficiently maintain durability of the buffer portion 41b. In other words, in a state in which only the buffer portion 41b comes in contact with the edges 62, 63 on both the front and rear sides of the vertically long hole 35b, a rotation force is applied to the buffer portion 41b from the convex engaging portion 39b in the tightening direction of the drive-side cam 16. The rotation force is applied to the buffer portion 41b by way of the engaging portion between both end surfaces on the top and bottom of the convex engaging portion 39b, and the end surfaces of the buffer portion 41b, which is the opposing surfaces, that face each other. However, the end surfaces of the buffer portion 41b that face each other are surfaces that do not have any stepped portion, and they face approximately in the up-down direction. In other words, the end surfaces of the buffer portion 41b that face each other, face in a direction so as not to be able to efficiently support the rotation force in the tightening direction of the drive-side cam 16 (force in the circumferential direction centered around the adjustment rod 14). Therefore, there is a possibility that this rotation force will damage the buffer portion 41b, or that the shock absorbing function of the buffer portion 41b will be lost.

In addition, JP 2008-307959 (A) discloses construction of a driven-side cam in which the cam surface portion is formed using a metal material, and the convex engaging portion are made of synthetic resin. With this construction, it is possible to prevent the occurrence of noise that is caused by contact between metal of the driven-side cam and the support plate portions. However, the entire convex engaging portions of the driven-side cam that engages with the vertically long holes are made of just synthetic resin, so as the edges on both the front and rear sides of the convex engaging portions are used over a long period of time, the wear gradually becomes large due to sliding contact with the edges on both the front and rear sides of the vertically long holes and the looseness becomes large. Furthermore, it is possible to form the vertically long holes so as to be straight, however, this is not preferred because it becomes impossible to smoothly adjust the up-down position of the steering wheel 1.

RELATED LITERATURE

Patent Literature

[Patent Literature 1] JP 2012-040904 (A)
[Patent Literature 2] JP 2012-040949 (A)
[Patent Literature 3] WO 2012/011424 (A1)
[Patent Literature 4] WO 2012/011425 (A1)
[Patent Literature 5] WO 2012/011426 (A1)
[Patent Literature 6] WO 2012/017853 (A1)
[Patent Literature 7] WO 2012/017854 (A1)
[Patent Literature 8] JP 2008-307959 (A)

SUMMARY OF INVENTION

Problem to be Solved by Invention

Taking into consideration the situation described above, it is the object of the present invention to provide construction of a tilt steering apparatus that is able to prevent the occurrence of unpleasant noise during height adjustment of a steering wheel and to maintain sufficient durability, and is also able to improve the operational feeling of operating an adjustment lever while maintaining the smoothness in adjusting the height position of the steering wheel.

Means for Solving Problems

The tilt steering apparatus of the present invention, has:

a steering column that is pivotally displaced centered around a tilt shaft that is provided in the width direction of the front section or the section on the front side of the tilt steering apparatus, and supports a steering shaft on the inside thereof such that the steering shaft can rotate freely;

a fixed-side bracket made of a metal material that is supported by a vehicle body and has a pair of support plate portions that hold the steering column;

vertically long holes that are provided in positions in each of the pair of support plate portions that are aligned with each other, and that extend in the up-down direction;

an adjustment rod that is inserted in the width direction through the vertically long holes;

an anchor portion on the base-end portion of the adjustment rod and that engages with one of the vertically long holes that is provided in one of the pair of support plate portions so as to be able to be displaced along the one vertically long hole;

a driven-side cam made of metal material that constitutes a cam apparatus that expands or contracts the axial dimension according to the rotation of the adjustment rod, that is fitted around the portion near the tip end of the adjustment rod so as to be capable of relative rotation with respect to the adjustment rod, that has a driven-side cam surface on the outside surface thereof, and that has a convex engaging portion formed so as to protrude from the inside surface thereof and engaging with the other vertically long hole that is provided in the other support plate portion so as to be able to be displaced along the other vertically long hole in a state such that rotation centered around the adjustment rod is suppressed; and a buffer member that is formed using a material that is softer than the metal material of the driven-side cam and the metal material of the fixed-side bracket, and that is attached to the convex engaging portion.

Particularly, in the tilt steering apparatus of the present invention, stoppers are provided in at least two locations in the buffer member that are rotationally symmetric about the center axis of the adjustment rod, and these stoppers prevent collision between the convex engaging portion and a front-side edge or a rear-side edge of the vertically long hole when the driven-side cam rotates as the dimension in the axial direction of the cam apparatus expands or contracts, and regulate the rotation of the driven-side cam.

In one embodiment of the present invention, the buffer member has a pair of buffer portions that have shapes to cover the surfaces on both the top and bottom ends of the convex engaging portion, and crank-shaped stepped surfaces that match each other are formed on the surfaces of both the top and bottom ends of the convex engaging portion and on the end surfaces of the pair of buffer portions that face each other so as to match each other, and the stepped surfaces of the buffer portions function as stoppers.

Specifically, buffer-portion-side protrusions that protrude in the up-down direction are respectively provided in part in the forward-backward direction of the end surfaces of the pair of buffer portions that face each other, and convex-portion-side protrusions that protrude in the up-down direction are respectively provided in part in the forward-backward direction of the surfaces on both the top and bottom ends of the convex engaging portion, and the buffer-portion-side protrusions that come in contact with the convex-portion-side protrusions function as the stoppers. More Specifically, the cam apparatus further has a drive-side cam fastened around the tip-end portion of the adjustment rod so as to be able to rotate centered around the adjustment rod and having a drive-side cam surface that is provided on the inside surface thereof and that comes in contact with the driven-side cam surface; and the convex engaging portion and the buffer member are constructed such that the side surfaces of the convex-portion-side protrusions on the front sides in the tightening direction of the drive-side cam, which is the rotational direction of the driven-side cam when the axial dimension of the cam apparatus is expanded, come in contact with the side surfaces of the buffer-portion-side protrusions on the rear sides in the tightening direction.

In this case, the width dimension in the forward-backward direction of the buffer-portion-side protrusions is half or greater than the width dimension in the forward-backward direction of the end surfaces of the pair of buffer portions that face each other.

Moreover, it is preferable that the surfaces on both the top and bottom ends of the convex engaging portion and the end surfaces of the pair of buffer portions that face each other are rotationally symmetric about the center axis of the adjustment rod.

In another embodiment of the present invention, the cam apparatus has a drive-side cam fastened around the tip-end portion of the adjustment rod so as to be able to rotate centered around the adjustment rod and having a drive-side cam surface on the inside surface thereof that comes in contact with the driven-side cam surface; and cover portions that cover portions near both the top and bottom ends of at least the side surfaces of both side surfaces of the convex engaging portion on the front side in the tightening direction, which is the rotational direction of the drive-side cam when the dimension in the axial direction of the cam apparatus is expanded, prevent abutment between the portions near both the top and bottom ends of the side surfaces on the front side and the inside edges on the front side of the vertically long hole, and functions as the stoppers are provided in part of the buffer member.

More specifically, the buffer member has a pair of buffer portions that cover the surfaces on both the top and bottom ends of the convex engaging portion; and the cover portions extend in the up-down direction from at least the front-side end portions in the tightening direction of the pair of buffer portions.

In this case, it is preferable that concave portions are formed on both the top and bottom ends of the surfaces of both the front and rear sides of the convex engaging portion; the width dimension in the forward-backward direction of the both the top and bottom end portions of the convex engaging portion is narrower than the intermediate portion in the up-down direction of the convex engaging portion;

the cover portions extend in directions toward each other from both the front and rear end portions of the pair of buffer portions, and engage with the concave portions; and both side surfaces in the forward-backward direction of the intermediate portion in the up-down direction of the convex engaging portion do not protrude further in the forward-backward direction than the cover portions.

In either of the embodiments, it is preferable that the buffer member has a pair of buffer portions that have shapes to cover the surfaces on both the top and bottom ends of the convex engaging portion, and that respectively have low-rigidity portions that are formed by portions of which material has been removed in both the front and rear portions thereof. Furthermore, it is preferable that the low-rigidity portions protrude further in the forward-backward direction than the surfaces on both the front and rear sides of the convex engaging portion, and in the neutral state in which no rotation force in a direction that expands the axial dimension of the cam apparatus is applied from the drive-side cam to the driven-side cam, both the side surfaces in the forward-backward direction of the convex engaging portion does not come in contact with the edges on both the front and rear sides of the vertically long hole and only the low-rigidity portions come in elastic contact with the edges on both the front and rear sides of the vertically long hole.

Moreover, in any of the embodiments, it is preferable that a through hole having an elliptical shape as seen from the axial direction is provided so as to pass in the axial direction through the center portion of the driven-side cam, and a pair of hook-shaped pieces are provided so as to protrude from both end portions in the width direction of the center portion in the up-down direction of the outside surface of the buffer member such that tip-end portions of the hook-shaped pieces are locked to the edge portions on both sides in the major axis direction of the through hole.

Furthermore, in any of the embodiments, it is preferable that the tilt steering apparatus of the present invention has:

a receiving bracket having: a concave groove that is provided with a female gear on the inside surface thereof, extends in the direction along the vertically long hole of the other support plate portion, is opened toward the front or the rear, and the receiving bracket being fastened to the outside surface of the other support plate portion;

a pivot arm having a male gear on one end portion thereof that can engage with or disengage from the female gear, and that is supported by part of the outside surface of the other support plate portion so as to be able to be pivotally displaced centered around the adjustment rod; and a pivot transmission portion is provided between the pivot arm and the adjustment lever, and in a state that the dimension in the axial direction of the cam apparatus is expanded by rotating the adjustment lever and engage the female gear with the male gear, and in a state that the dimension in the axial direction of the cam apparatus is contracted, the pivot arm pivots in a direction that disengage the female gear and male gear from each other.

Effect of Invention

In the present invention, stoppers are provided in at least two locations in the buffer member that are rotationally symmetric about the center axis of the adjustment rod, and these stoppers prevent collision between the convex engaging portion and front-side surface or rear-side surface of the vertically long hole when the driven-side cam rotates as the axial dimension of the cam apparatus expands or contracts, and regulate the rotation of the driven-side cam, so not only is it possible to prevent unpleasant metal noise due to the surfaces on both the top and bottom ends of the convex engaging portion of the driven-side cam colliding in the up-down direction with both the top and bottom edges of the vertically long hole when the driven-side cam moves in the up-down direction inside the vertically long hole during height adjustment of the steering wheel, but it is also possible to prevent the occurrence of unpleasant metal noise due to the surfaces on both the front and rear sides of the convex engaging portion colliding in the rotational direction with both the front and rear edge portions of the vertically long hole caused by rotation of the driven-side cam. Furthermore, these stoppers make it possible to maintain the durability of the driven-side cam and the buffer member; and even when used over a long period time, make it possible to improve the operational feeling of operating the adjustment lever without impairing smoothness in adjusting the height position of the steering wheel.

MODES FOR CARRYING OUT INVENTION

FIRST EXAMPLE

Figure 1:
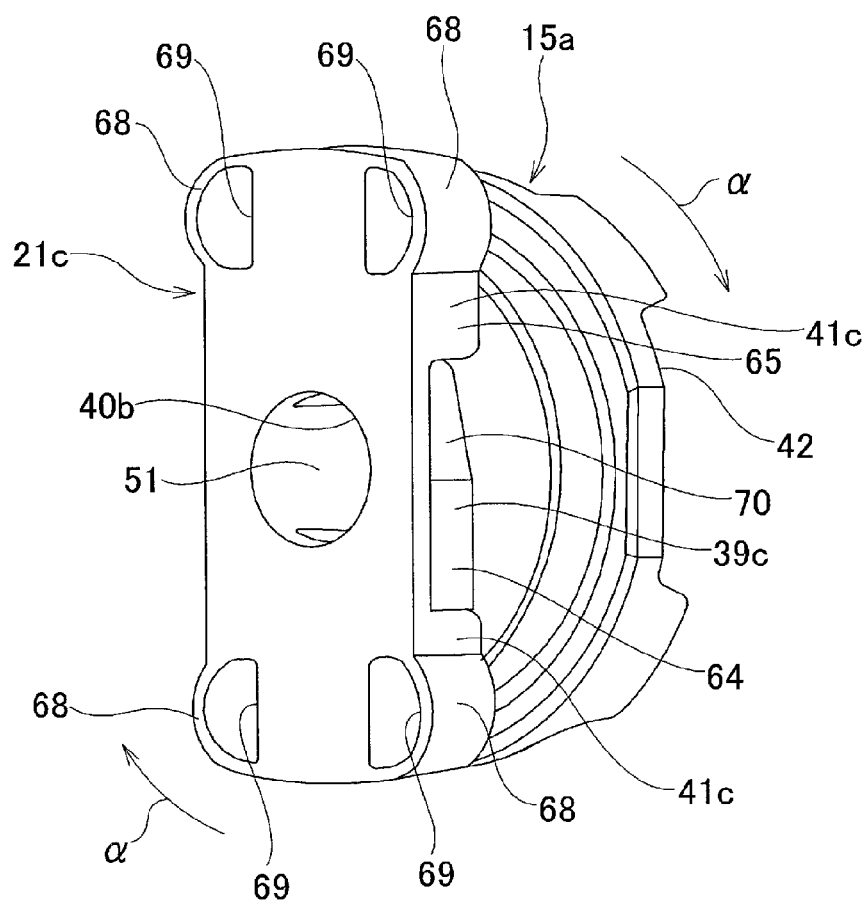
FIG. 1 is a perspective view of a first example of an embodiment of the present invention, and illustrates a driven-side cam and buffer member that have been assembled together as seen from the inside-surface side.
Figure 2:
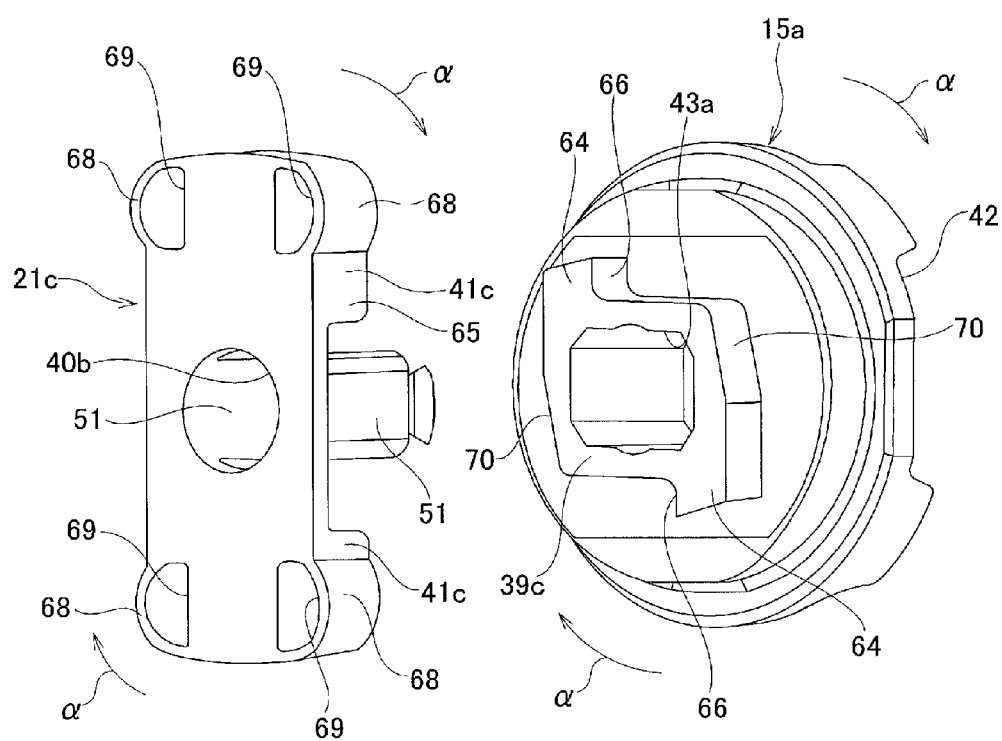
FIG. 2 is an exploded perspective view of the driven-side cam and buffer member illustrated in FIG. 1 as seen from the inside-surface side.
Figure 3:
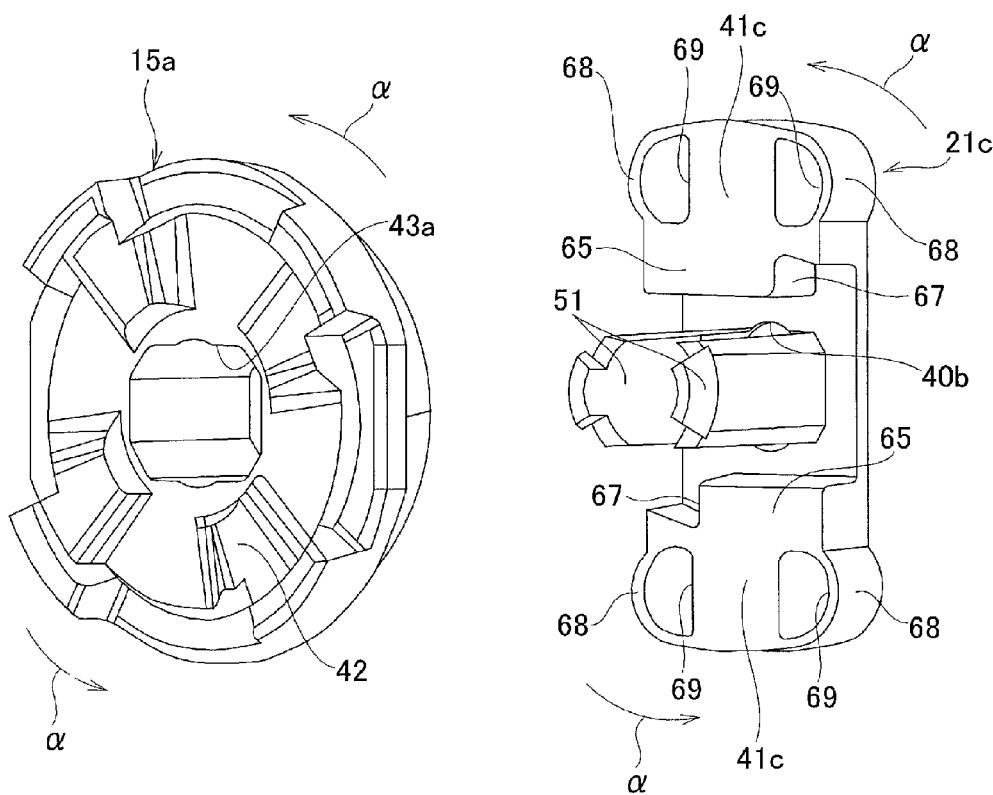
FIG. 3 is an exploded perspective view of the driven-side cam and buffer member illustrated in FIG. 1 as seen from the outside-surface side.

FIG. 1 to FIG. 6 illustrate a first example of an embodiment of the present invention. The tilt steering apparatus of this example basically has: a steering column 6a that is pivotally displaced centered around a tilt shaft (not illustrated) that is provided in the width direction in the front section and that supports a steering shaft 5a on the inside so as to be able to rotate freely; a fixed-side bracket 13 that is made of metal, is supported by the vehicle body and has a pair of support plate portions 34a, 34b that hold the steering column 6a; vertically long holes (long tilt holes) 35a, 35b that extend in the up-down direction and are provided in portions of the support plate portions 34a, 34b that are aligned with each other; an adjustment rod 14 that is inserted in the width direction through the vertically long holes 35a, 35b; an anchor portion 37 that is provided in a portion on the base-end portion of the adjustment rod 14 that protrudes from the outside surface of one of the support plate portions 34a, and that engages with the vertically long hole 35a of the one support plate portion 34a so as to be able to be displaced along the vertically long hole 35a, and a driven-side cam 15a that is made of metal that forms a cam apparatus 47 that causes the dimension in the axial direction thereof to expand or contract according to the rotation of the adjustment rod 14, is fitted around the outside of a portion near the tip end of the adjustment rod 14 that protrudes from the outside-surface of the other support plate portion 34b so as to able to rotate relative to the adjustment rod 14, has a driven-side cam surface 42 that is provided on the outside surface thereof and has a convex engaging portion 39c that is provided on the inside surface that engages with the vertically long hole 35b of the other support plate portion 34b so as to be able to be displaced along the vertically long hole 35b, and is engaged in a state such that rotation centered around the adjustment rod 14 is prevented. A through hole 43a that has an elliptical shape as seen from the axial direction and that passes through in the axial direction is provided in the center portion of the driven-side cam 15a.

More specifically, a displacement-side bracket 12 is fastened to the intermediate portion in the axial direction of the steering column 6a, and through holes 32 that pass through in the width direction are formed in portions of part of the displacement-side bracket 12 that are aligned with the vertically long holes 35a, 35b. An installation plate portion 33 is provided in the top portion of the fixed-side bracket 13, and the fixed-side bracket 13 is supported by the vehicle body by way of this installation plate portion 33. The pair of support plate portions 34a, 34b are formed so as to hang down from the installation plate portion 33 and hold the displacement-side bracket 12 on both sides in the width direction. The adjustment rod 14 is also inserted through the through holes 32 in the displacement-side bracket 12.

The cam apparatus 47 has the driven-side cam 15a, and a drive-side cam 16 that is fitted around the tip-end portion of the adjustment rod 14 in a state so as to be able to rotate centered around the adjustment rod 14 and such that displacement toward the tip-end side of the adjustment rod 14 is suppressed, and has a drive-side cam surface 44 provided on the inside surface thereof; and is such that the driven-side cam surface 42 and the drive-side cam surface 44, which are both uneven surfaces in the circumferential direction, engage with each other. In this example, the base-end portion of an adjustment lever 17 that rotates the adjustment rod 14 is joined to the drive-side cam 16.

Furthermore, the tilt steering apparatus of this example has a buffer member 21c that is formed using a material that is softer than the metal material of the driven-side cam 15a and the metal material of the fixed-side bracket 13 (support plate portions 34a, 34b), and is assembled by fitting and fastening to the convex engaging portion 39c. A feature of this example is the shape of the convex engaging portion 39c that is formed on the inside surface of the metal driven-side cam 15a, and the shape of the synthetic resin buffer member 21c that is assembled in the convex engaging portion 39c. The construction and functions of the other parts are the same as in a tilt steering apparatus having conventional construction.

In this example as well, the buffer member 21c has a pair of buffer portions 41c that are provided in portions on both the top and bottom sides of a circular hole 40b that is formed in the center portion. The convex engaging portion 39 fits inside between the pair of buffer portions 41c, and the surfaces on both the top and bottom ends of the convex engaging portion 39c are covered by the buffer portions 41c. In this example, in this state, the surfaces on both the front and rear sides of the convex engaging portion 39c are constructed so as to not protrude further in the forward-backward direction than the surfaces on both the front and rear sides of the buffer portions 41c. Moreover, a pair of protruding hook shaped pieces 51, of which the tip-end portions lock with the edge portions on both sides in the major axis direction of the through hole 43a, are provided on both end portions in the width direction in the center portion in the up-down direction of the outside surface of the buffer member 21c. As a result, the driven-side cam 15a and the buffer member 21c are prevented from separating, while at the same time, the driven-side cam 15a is prevented from becoming loose in the neutral state.

Particularly, in this example, the surfaces on both the top and bottom sides of the convex engaging portion 39 and the end surfaces of the buffer portions 41c that face each other, which are opposing surfaces for the top and bottom side surfaces of the convex engaging portion 39, are constructed by crank-shaped stepped surfaces that fit with each other. In other words, convex portion-side protrusions 64 that protrude in the up-down direction are formed on the rear-end portions of the surfaces on both the top and bottom ends of the convex engaging portion 39c in the direction of tightening of the drive-side cam 16 (direction of arrow α in FIG. 1 to FIG. 5). As a result, the surfaces on both the top and bottom ends of the convex engaging portion 39c become crank shaped stepped surfaces. Moreover, buffer-portion-side protrusions 65 that protrude in the up-down direction are formed on the end surfaces of the buffer portions 41c that face each other in the area from the front-end portion to the center portion in the direction of tightening (direction of arrow α). In this example, the width dimension w in the forward-backward direction of these buffer-portion-side protrusions 65 are slightly larger than two thirds the width dimension W in the forward-backward direction of the end surfaces of the buffer portions 41c that face each other (w>(⅔) W). By providing such buffer-portion-side protrusions 65, the end surfaces of the buffer portions 41c that face each other become crank shaped stepped surfaces that match with the end surfaces on both the top and bottom of the convex engaging portion 39c. With the surfaces on both the top and bottom ends of the convex engaging portion 39c matched to the end surfaces of the buffer portions 41c that face each other, the side surfaces 66 of the surfaces on both the front and rear sides of the convex portion-side protrusions 64 on the front side in the direction of tightening (direction of arrow α) come in contact with the side surfaces 67 of the surfaces on both the front and rear sides of the buffer-portion-side protrusions 65 on the rear side in the direction of tightening (direction of arrow α). In other words, in this example, the buffer-portion-side protrusions 65 that form crank shaped stepped surfaces that function as stoppers are provided at two locations of the pair of buffer portions 41c that are rotationally symmetric with respect to the center axis of the adjustment rod 14.

Moreover, low-rigidity portions 68 are provided in the four corners on the top and bottom and front and rear of the buffer member 21c in both the front and rear end portion of the upper half of the buffer portion 41c on the top side, and in both the front and rear end portions of the lower half of the buffer portion 41c on the bottom side. By suitably lowering the rigidity of the low-rigidity portions 68 by providing through holes 69, which are portions where the material has been removed, in the inside portions of the low-rigidity portions 68, so as to pass in the axial direction, the low-rigidity portions 68 have an increased shock absorbing function. In this example, both the top and bottom end portions of the surfaces on both the front and rear sides of the buffer member 21c that correspond to the low-rigidity portions 68 protrude slightly further in the forward-backward direction than the intermediate portion in the up-down direction, which corresponds to the remaining portion.

Figure 4:
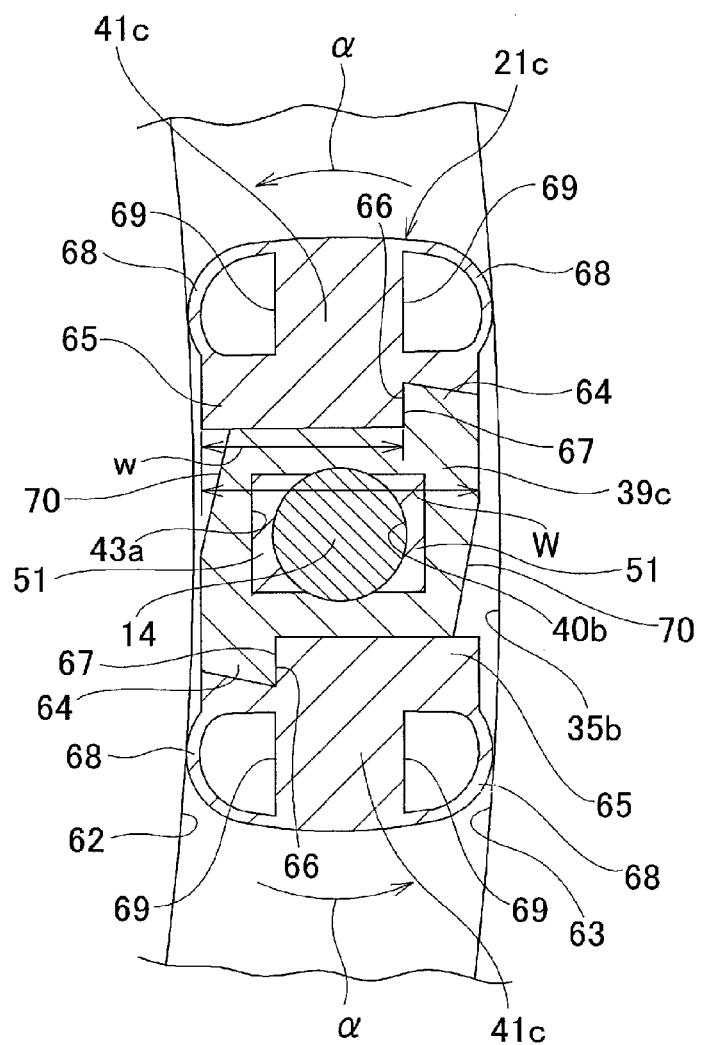
FIG. 4 is a schematic view of a first example of an embodiment of the present invention, and illustrates the engaged state between the vertically long hole and the convex engaging portion and buffer member when in the free state.

As illustrated in FIG. 4, in a state in which at least position adjustment of the steering wheel 1 is possible, or in other words, in a neutral state in which no rotation force is applied from the drive-side came 16 to the driven-side cam 15a in the tightening direction (direction of arrow α), and also no rotation force is applied from the convex engaging portion 39c to the buffer member 21c in the tightening direction (direction of arrow α), the surfaces of both the front and rear sides of the convex engaging portion 39c do not come in contact with the front-side edge 62 or rear-side edge 63 of the vertically long hole 35b, and only the low-rigidity portions 68 of the buffer portions 41c gently come in elastic contact with the front-side edge 62 and rear-side edge 63. As a result, looseness of the convex engaging portion 39c in the direction of rotation inside the vertically long hole 35b is suppressed by the elastic force of these low-rigidity portions 68.

In this example, the overall shape of the driven-side cam 15a that includes the convex engaging portion 39c, and the overall shape of the buffer member 21c that includes the buffer portions 41c are formed so as to be rotationally symmetric centered on the center axis of the adjustment rod 14 that is inserted through the circular hole 40b. As a result, there is no restriction in the up-down assembly direction of the driven-side cam 15a and absorbing member 21c, so assembly work can be performed easily.

In the case of the tilt steering apparatus of this example, when the drive-side cam 16 is rotated in the tightening direction (direction of arrow α) by the adjustment lever 17 after the position of the steering wheel 1 has been adjusted in order to maintain the adjusted position, a rotation force in the same direction (direction of arrow α) is applied to the driven-side cam 15a on the basis of the drive-side cam surface 44 of the drive-side came 16 and the driven-side cam surface 42 of the driven-side cam 15a pressing against each other. As illustrated in order from FIG. 4 to FIG. 5, this rotation force rotates the convex engaging portion 39c and buffer member 21c just a minute amount in the same direction (direction of arrow α) on the inside of the vertically long hole 35b. Due to this rotation, of the low-rigidity portions 68 that are located in the four corner portions, the low rigidity portions 68 in the two diagonally opposite locations that are located at the front in the same direction (direction of the arrow α) (one location at the top left and one location at the bottom right in FIG. 5) are pressed by the edges 62, 63 on both the front and rear sides of the vertically long hole 35b, and are elastically compressed. At the same time, of the surfaces on both the front and rear sides of the buffer member 21c, the portions that are adjacent to the center side in the up-down direction with respect to the two low-rigidity portions 68 that are diagonally opposite each other come in contact with the edges 62, 63 on both the front and rear sides of the vertically long hole 35b. As a result, as indicated by the bold arrows in FIG. 5, the side surfaces 66 on the front side in the tightening direction (direction of arrow α) of the convex portion-side protrusions 64 that form the crank shaped stepped surfaces of the convex engaging portion 39c push the side surfaces 67 on the rear side in the tightening direction (direction of arrow α) of the buffer-portion-side protrusions 65 that form the crank shaped stepped surfaces of the buffer portion 41c, and, the buffer-portion-side protrusions 65 of the buffer portions 41c are compressed in the forward-backward direction between the edges 62, 63 on both the front and rear sides and the side surfaces of the convex portion-side protrusions 64, and by functioning as stoppers for stopping the rotation of the driven-side cam 15a, the rotation force in the same direction (direction of arrow α) is supported. This prevents the convex engaging portion 39c and the buffer member 21c from rotating further in the same direction (direction of arrow α) inside the vertically long hole 35b.

In this example, even when the convex engaging portion 39c rotates just a minute amount, collision between the surfaces on both the front and rear sides of the convex engaging portion 39c and the edges 62, 63 on both the front and rear sides of the vertically long hole 35b can be essentially avoided. Specifically, of both half portions in the up-down direction of the surfaces on both the front and rear sides of the convex engaging portion 39c, the half portions on the sides that come close to the edges 62, 63 on both the front and rear sides of the vertically long hole 35b during rotation in the same direction (direction of arrow α) are constructed by inclined surface portions 70 that are inclined in a direction toward the center side in the forward-backward direction going toward the buffer portions 41c in the up-down direction.

Figure 5:
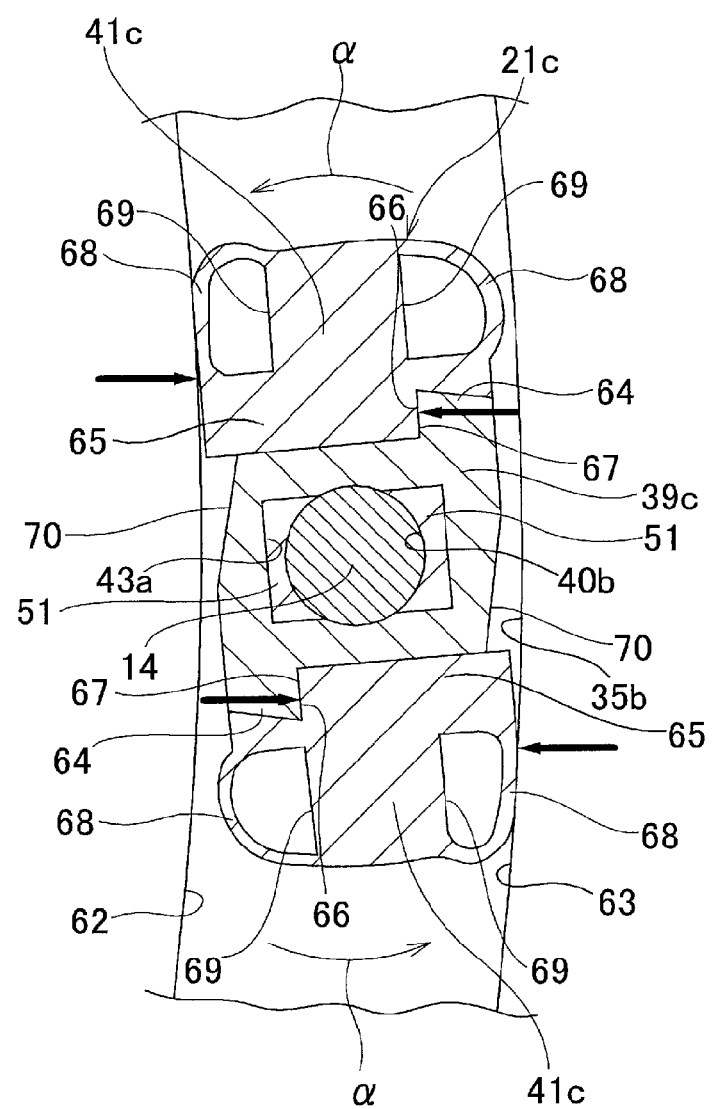
FIG. 5 is a schematic view of the engaged state illustrated in FIG. 4, and illustrates the state when a rotation force acts on the buffer member from the convex engaging portion in the tightening direction of the drive-side cam.
Figure 6:
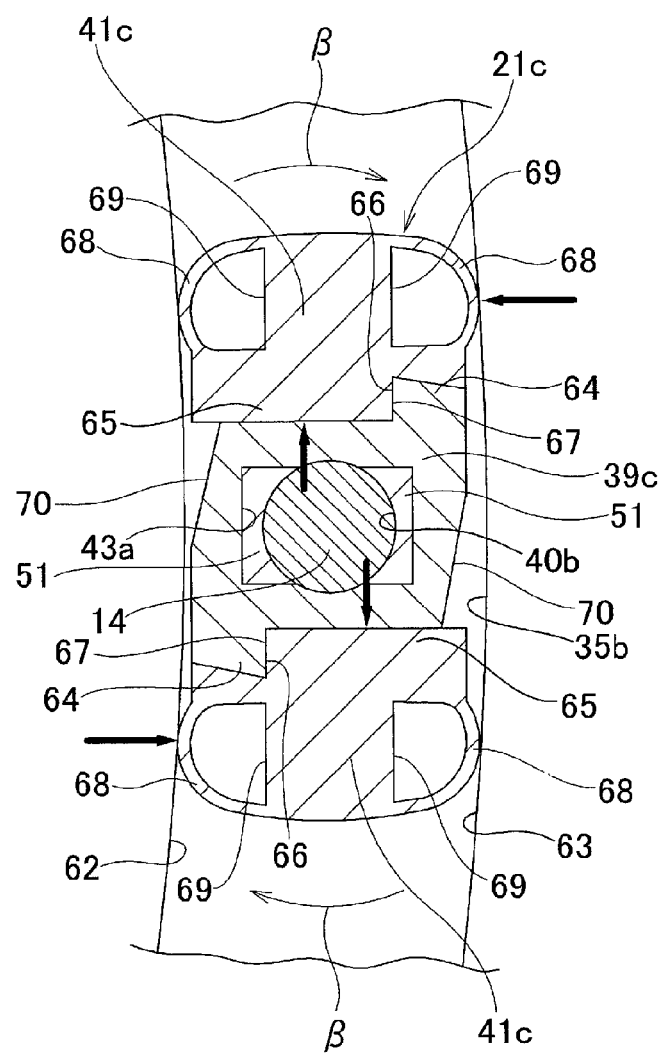
FIG. 6 is a schematic view of the engaged state illustrated in FIG. 4, and illustrates the state when a rotation force acts on the buffer member from the convex engaging portion in opposite the tightening direction of the drive-side cam.

On the other hand, when the adjustment lever 17 rotates the drive-side cam 16 in the direction opposite the tightening direction (direction opposite the direction of arrow α) from the state illustrated in FIG. 5 in order to make it possible to adjust the position of the steering wheel 1, a rotation force is applied in the same direction (direction opposite the direction of arrow α) to the driven-side cam 15a due to the friction engagement between the drive-side cam surface 44 and the driven-side cam surface 42. Due to this rotation force, as illustrated in order from FIG. 5 to FIG. 6, the convex engaging portion 39c and the buffer member 21c rotate just a minute amount in the same direction (direction opposite the direction of arrow α or direction of arrow β) inside the vertically long hole 35b. Due to this rotation, the low-rigidity portions 68 located in diagonally opposite corners are elastically restored. At the same time, as illustrated by the bold arrows in FIG. 6, the buffer portions 41c are in a stiff state between the edges 62, 63 on both the front and rear sides of the vertically long hole 35b, and the portions separated from the convex portion-side protrusions 64 of the surfaces of both the top and bottom ends of the convex engaging portion 39c. As a result, the friction engagement between the drive-side cam surface 44 and the driven-side cam surface 42 is released, and further rotation of the concave engaging portion 39c and buffer member 21c in the same direction (direction of arrow β) inside the vertically long hole 35b is prevented. The friction engagement force between the drive-side cam surface 44 and the driven-side cam surface 42 is small. Therefore, in the state illustrated in FIG. 6, the friction engagement between the drive-side cam surface 44 and the driven-side cam surface 42 is released easily without the occurrence of large elastic deformation of the buffer portions 41c.

In the case of the tilt steering apparatus of this example, looseness of the convex engaging portion 39c in the direction of rotation inside the vertically long hole 35b is suppressed by the elastic force of the low-rigidity portions 68. Therefore, an unpleasant feel of looseness that is transmitted to the driver that operates the steering wheel 1 is suppressed. In this example, in the neutral position illustrated in FIG. 4, the low-rigidity portions 68 elastically and lightly come in contact with the edges 62, 63 on both the front and rear sides of the vertically long hole 35b; however, because the rigidity of these low-rigidity portions 68 is low, the contact force against the edges 62, 63 on both the front and rear sides can be kept low. Therefore, the friction force that acts in these contact areas can be kept small, and when adjusting the height position of the steering wheel 1, the convex engaging portion 39c and the buffer member 21c can be smoothly moved by a light force along the vertically long hole 35b.

With the tilt steering apparatus of this example, it is possible to improve the durability of the buffer member 21c. In other words, in this example, in the state illustrated in FIG. 5, the rotation force in the tightening direction (direction of arrow α) is transmitted from the convex engaging portion 39c to the buffer portions 41c by way of the side surfaces 66 on the front sides in tightening direction (direction of arrow α) of the convex portion-side protrusions 64 and the side surfaces 67 on the rear sides in the tightening direction (direction of arrow α) of the buffer-portion-side protrusions 65. Here, the side surfaces 67 of the buffer-portion-side protrusions 65 face in nearly the forward-backward direction. In other words, these side surfaces 67 face in a direction that can efficiently support the rotation force (force in the circumferential direction centered around the adjustment rod 14) in the tightening direction (direction of arrow α). Therefore, in the state illustrated in FIG. 5, it is possible to efficiently support the rotation force in the tightening direction (direction of arrow α) by the buffer-portion-side protrusions 65. In this example, the width dimension w in the forward-backward direction of these buffer-portion-side protrusions 65 is sufficiently large (w> (2/3) W), so the strength of these buffer-portion-side protrusions 65 is sufficiently maintained. Therefore, it is difficult for the buffer portions 41*c* that include these buffer-portion-side protrusions 65 to be damaged, and it is possible to improve the durability of the buffer member 21*c* by an amount due to these buffer-portion-side protrusions 65.

In this example as well, as in the conventional construction, it is preferable that the height position of the steering wheel 1 is maintained by engagement between a female gear 50 and male gear 54. In this case, even though the axial force that is generated by the cam apparatus 47 is kept small, it is possible to securely maintain the height position. This axial force is sufficient as long as it is large enough that there is no looseness of the displacement-side bracket 12 inside the fixed-side bracket 13. Keeping the axial force generated by the cam apparatus 47 low is related to being able to keep the rotation force in the tightening direction (direction of arrow α) that is applied to the driven-side cam 15 low when rotating the drive-side cam 16 in the same direction (direction of arrow α) with the adjustment lever 17. Keeping this rotation force low is related to being able to suppress the rotating force that is transmitted from the convex engaging portion 39*c* to the buffer member 21*c*, which leads to make it easier to maintain the durability of the buffer member 21*c*. Therefore, by combining the construction of this example with a mechanism for maintaining the height position of the steering wheel 1 by the engagement of the female gear 50 and the male gear 54, a sufficient effect can be obtained. The axial force that is generated by the cam apparatus 47 can be arbitrarily and easily adjusted by adjusting the tightening torque of the nut 45.

In this example, it is preferable to employ similar construction as the convex engaging portion 39*c* and buffer portions 41*c* to the convex engaging portion 39*a* on the base-end side of the adjustment rod 14 and the pair of buffer portions 41*a* of the buffer member 21*a* that is attached to that convex engaging portion 39*a*, however, it is not absolutely necessary to employ the same construction. Moreover, the shape of the pair of vertically long holes 35*a*, 35*b* is not limited to a partial arc shape that is centered around the tilt shaft, and the effect of this example can also be obtained in the case where the shape is a simple straight shape. Furthermore, in regards to the installation direction of the pivot arm 19 on which the male gear 54 is provided, the construction illustrated in FIG. 14 to FIG. 18 could also be 180 degrees in the opposite direction. Not being limited to this, as long as the shape of the convex engaging portion 39*c* that is formed on the inside surface of the driven-side cam 15*a* and the shape of the synthetic resin buffer member 21*c* that is assembled in the convex engaging portion 39*c*, which are the feature of this example, are employed, other improvements and variations are within the range of the present invention.

SECOND EXAMPLE

FIG. 7 to FIG. 10 illustrate a second example of an embodiment of the present invention. In the case of the construction of this example, concave portions 71 are formed in four locations of both the top and bottom end portions of the surfaces on both the front and rear sides of the convex engaging portion 39*d*, and the width dimension in the forward-backward direction of the convex engaging portion 39*d* is narrower on both the top and bottom end portions in the up-down direction than the intermediate portion in the up-down direction. In other words, the intermediate portions in the up-down direction of both the front and rear sides of the convex engaging portion 39*d* protrude out slightly more than both end portions in the up-down direction. Moreover, buffer portions 41*d* are formed in positions of the buffer member 21*d* that surround the circular hole 40*b* that is formed in the center portion from both the top and bottom sides. The space between these buffer portions 41*d* is equal to or slightly larger than the height in the up-down direction of the convex engaging portion 39*d*; the convex engaging portion 39*d* fits inside between the buffer portions 41*d*; and both the top and bottom end surfaces of the convex engaging portion 39*d* are covered by these buffer portions 41*d*. Concave holes 72 are formed in the inside-surface sides of these buffer portions 41*d*. These concave holes 72 keep the volume of these buffer portions 41*d* small, and are provided in order to suppress the occurrence of deformation called shrinkage during the injection molding of synthetic resin, and in order to increase the shock absorbing function of these buffer portions 41*d* by keeping the rigidity of the buffer portions 14*d* suitably low.

Figure 7:
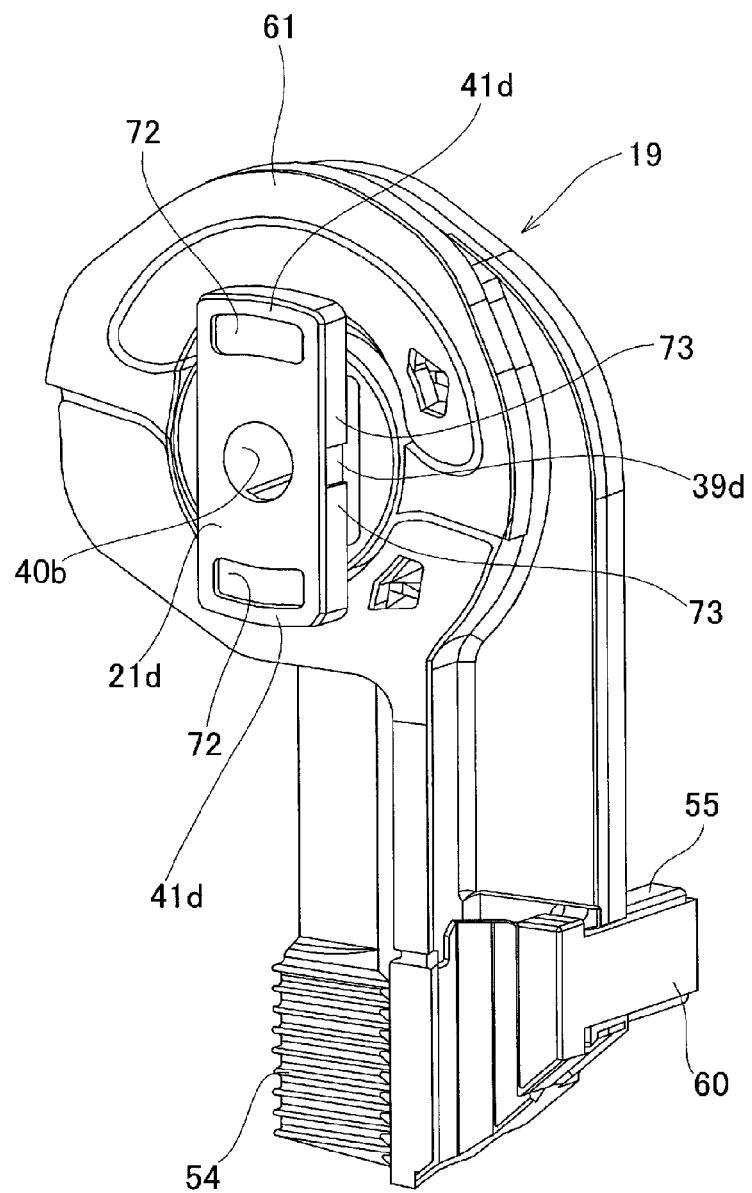
FIG. 7 is a perspective view of a second example of an embodiment of the present invention, and illustrates a pivot arm in which a buffer member has been assembled as seen from the inside-surface side.
Figure 8:
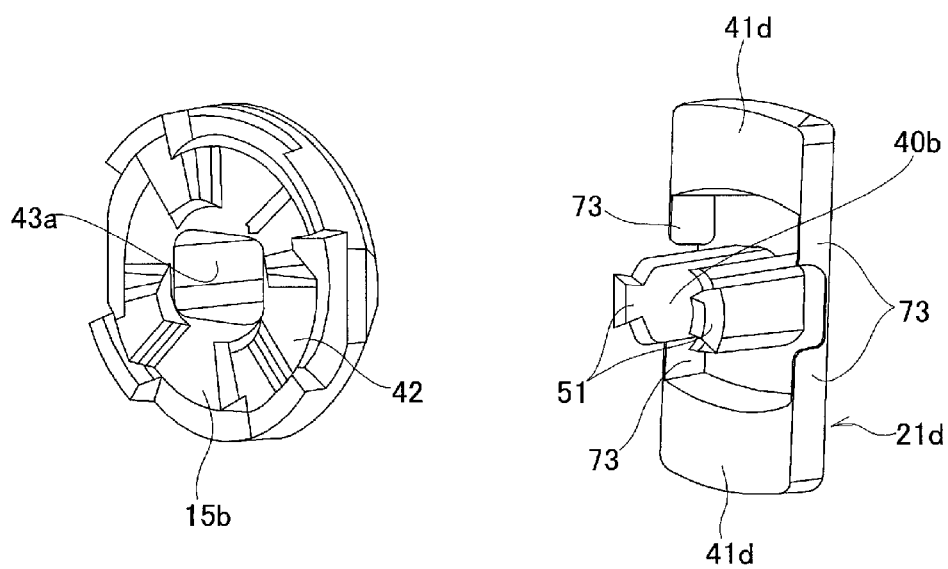
FIG. 8 is a perspective view of a second example of an embodiment of the present invention, and illustrates the driven-side cam and buffer member in the state before assembly as seen from the outside-surface side.
Figure 9:
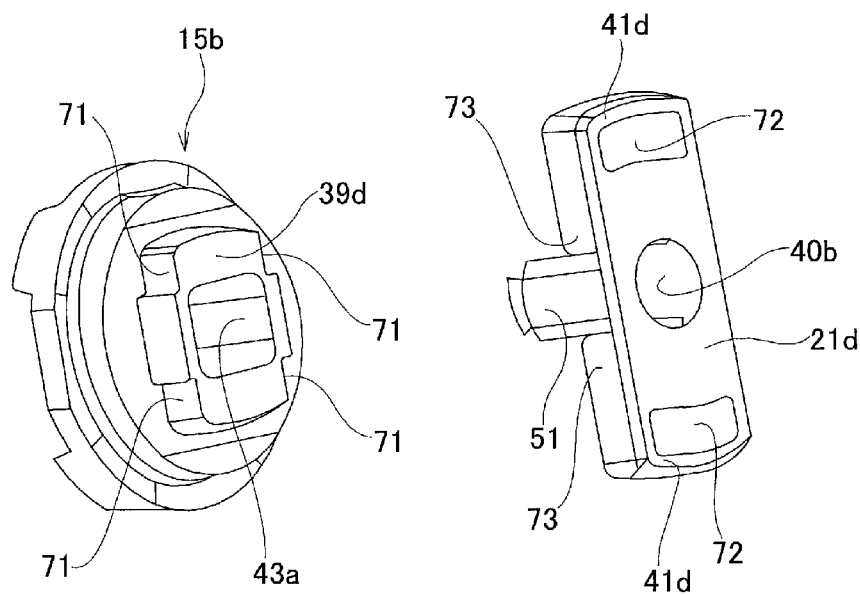
FIG. 9 is a perspective view of the driven side cam and buffer member illustrated in FIG. 8 in the state before assembly as seen from the inside-surface side.

Furthermore, in this example, flat plate-shaped cover portions 73 that extend in a direction toward each other are provided at a total of four locations on both the front and rear end portions of the surfaces of the buffer portions 41*d* that face each other. The thickness T of these cover portions 73 (see FIG. 10) is slightly greater than the height of stepped portions between the concave portions 71 that are formed on the surfaces on both the front and rear sides of the convex engaging portion 39*d* and the intermediate portion in the height direction (T>H). Moreover, the space D between the edges of the ends in the up-down direction of the top and bottom cover portions 73 is slightly greater than the length L in the up-down direction of the intermediate portion in the up-down direction of the surfaces on both the front and rear sides of the convex engaging portion 39*d* (D>L). Therefore, in a state in which the driven-side cam 15*b* and the buffer member 21*d* are brought close together from the state illustrated in FIG. 8 and FIG. 9 to a combined state as illustrated in FIG. 7, the convex engaging portion 39*d* fits between the buffer portions 41*d*, and both end portions in the up-down direction on both side surfaces in the forward-backward direction of the convex engaging portion 39*d* are covered by the cover portions 73. Moreover, in this state, the intermediate portions in the up-down direction of both side surfaces in the forward-backward direction of the convex engaging portion 39*d* do not protrude out further in the forward-backward direction than the cover portions 73. In other words, in this example, cover portions 73 that function as stoppers are provided at four locations in the pair of buffer portions 41*d* that are rotationally symmetric about the center axis of the adjustment rod 14. However, alternatively, it is also possible to provide cover portions 73 that function as stoppers at two locations in the pair of buffer portions 41*d* that are rotationally symmetric about the center axis, or in other words, only on the front sides in the tightening direction (direction of arrow α). In this example, the cover portions 73 do not function as stoppers alone, but working together with the pair of buffer portions 41*d* and function as stoppers for stopping rotation of the driven-side cam 15*b*.

Figure 10:
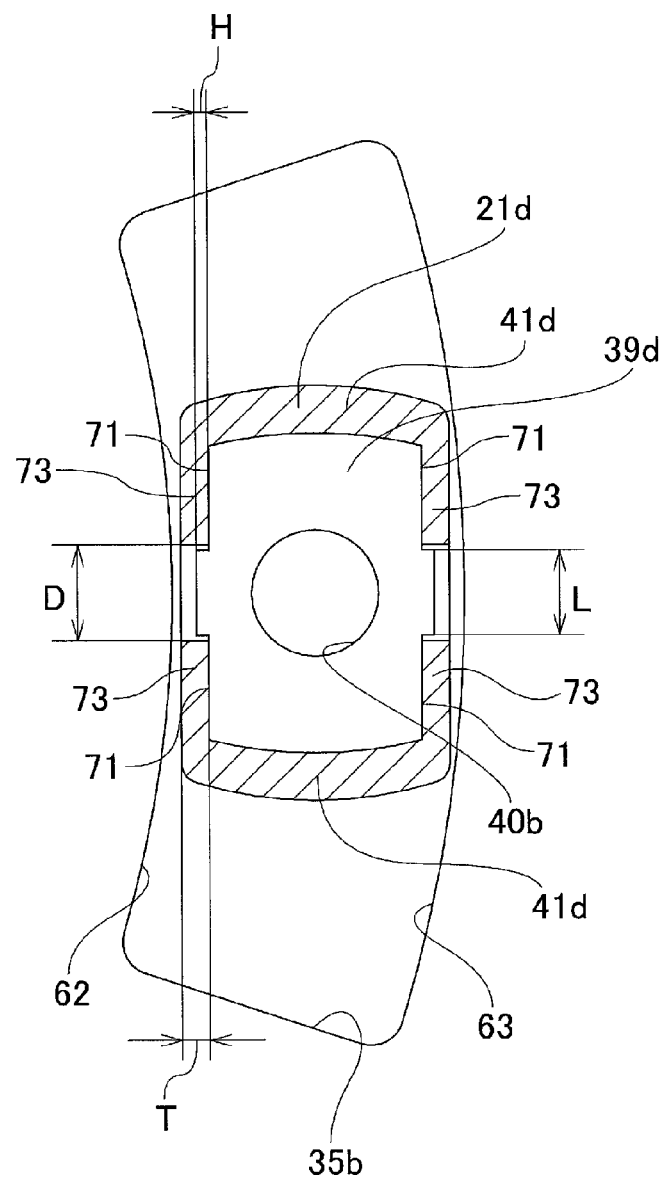
FIG. 10 is a schematic view of a second example of an embodiment of the present invention, and illustrates the engaged state between the vertically long hole and the convex engaging portion and buffer member when in the free state.

With the tilt steering apparatus of this example, the occurrence of unpleasant noise during height adjustment of the steering wheel 1 is prevented, and sufficient durability is maintained, and even when used over a long period of time, impairment of smooth operation when adjusting the up-down position of the steering wheel 1 is prevented. In other words, as illustrated in FIG. 10, cover portions 73 are located between the metal convex engaging portion 39*d* that is formed on the inside surface of the driven-side cam 15*b* and the edges 62, 63 on both the front and rear sides of the vertically long hole 35b. Therefore, there is no direct contact between the convex engaging portion 39d and the edges 62, 63 on both the front and rear sides, so unpleasant vibration and noise are not generated due to direct impact between metal members. In the construction of this example as well, the shape of the convex engaging portion 39d and the buffer member 21d have up-down symmetry, so even though the assembly direction is not regulated, the functions and effects described above can be obtained.

Moreover, with the driven-side cam 15b prevented from rotation centered around the adjustment rod 14 inside the vertically long hole 35b, construction for making it possible for the driven-side cam 15b to be displaced (rise or lower) along the vertically long hole 35b is carried out mainly by the metal convex engaging portion 39d. The cover portions 73 that rub against the edges 62, 63 on both the front and rear sides of the vertically long hole 35b are thin, so the amount of elastic deformation is limited, and even when pushed and slid against the edges 62, 63 on both the front and rear sides, the amount that the edges 62, 63 on both the front and rear sides bite into the cover portions 73 is kept small. Therefore, when compared with the case in which there is a large amount of biting between the members, the amount of wear of the cover portions 73 is kept small. Even if these cover portions 73 wear out, it is possible to prevent the driven-side cam 15b from rotating centered around the adjustment rod 14 by the convex engaging portion 39d, so even when used over a long period of time, impairment of smooth adjustment of the up-down position of the steering wheel 1 is prevented.

In this example as well, by providing construction that maintains the height position of the steering wheel 1 by the engagement of a female gear 50 and a male gear 54, a moment that is applied to the driven side cam 15 when expanding the dimension in the axial direction of the cam apparatus 47 is kept low, the force that pushes the cover portions 73 between the surfaces on both the front and rear sides of the convex engaging portion 39d and the edges 62, 63 on both the front and rear sides of the vertically long hole 35b is kept low, and the durability of the cover portions 73 is maintained. The construction and functions of the other parts are the same as in the tilt steering apparatus of the first example of an embodiment of the present invention.

THIRD EXAMPLE

Figure 11:
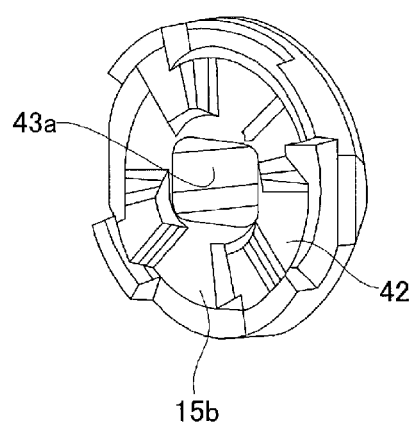
FIG. 11 is a perspective view of a third example of an embodiment of the present invention and illustrates the driven side cam and buffer member in the state before assembly as seen from the outside-surface side.
Figure 11:
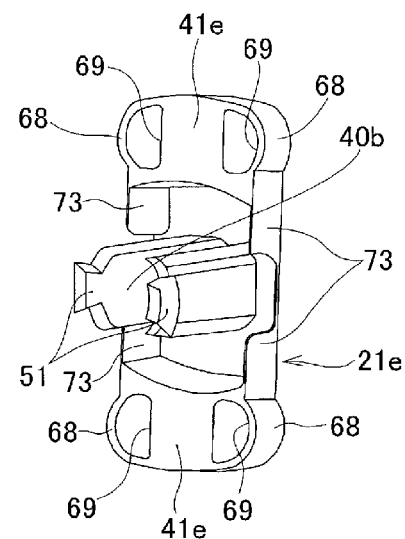
Figure 12:
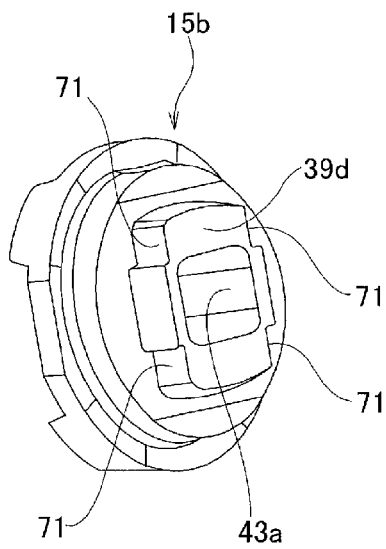
FIG. 12 is a perspective view of the driven side cam and buffer member illustrated in FIG. 11 in the state before assembly as seen from the inside-surface side.
Figure 12:
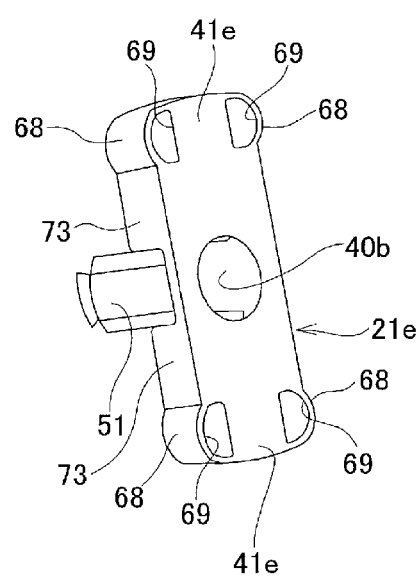
Figure 13:
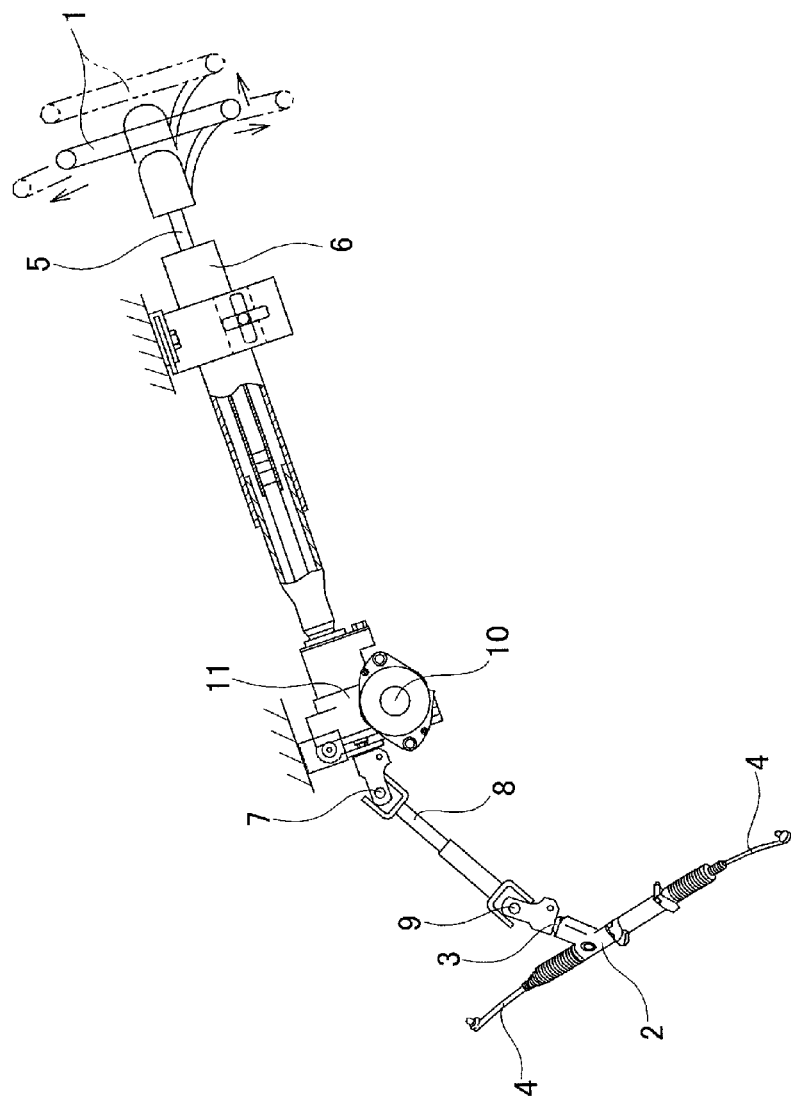
FIG. 13 is a simplified partial cross-sectional side view that illustrates an example of a conventional steering apparatus for an automobile.
Figure 14:
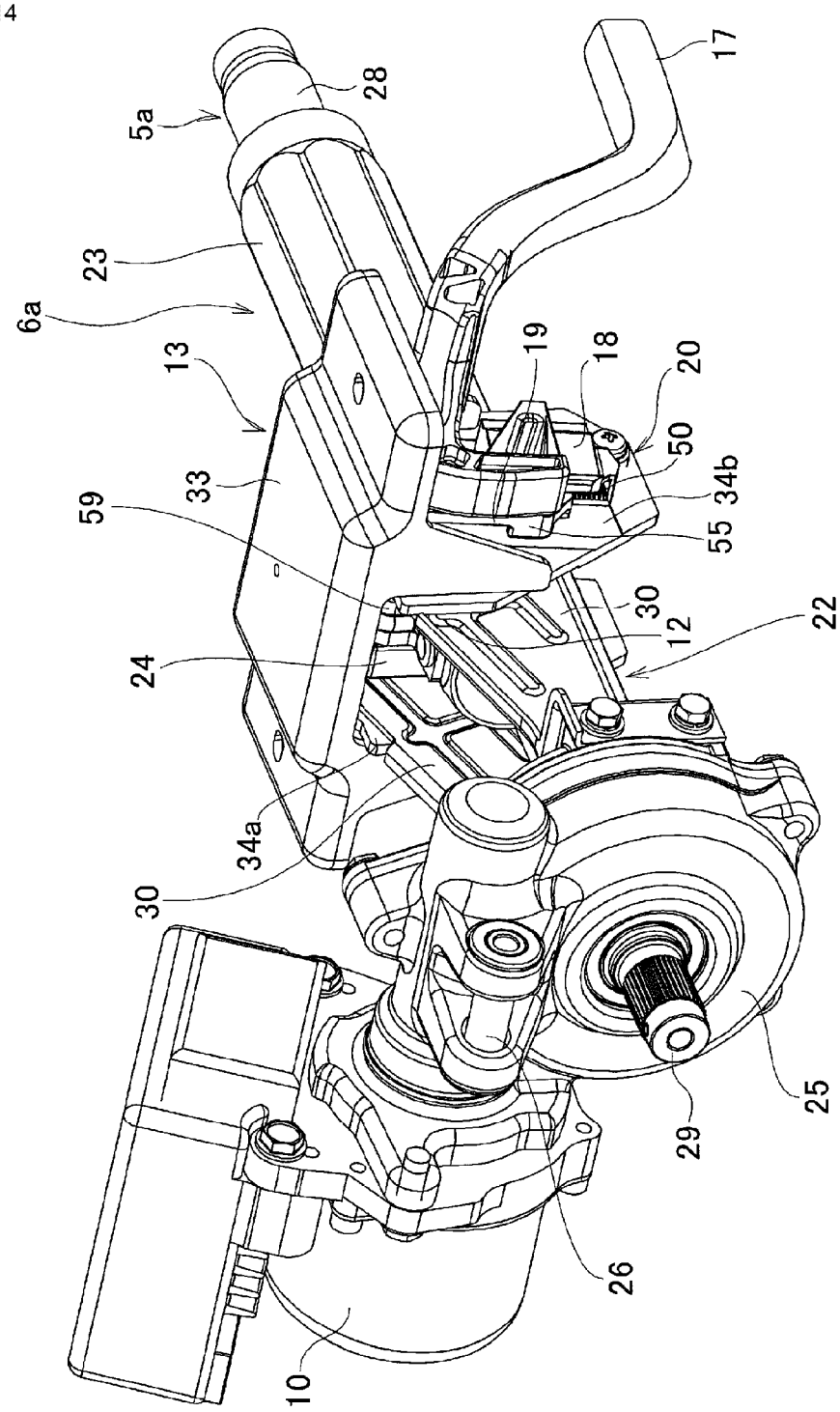
FIG. 14 is a perspective view of an example of the construction of a conventional tilt steering apparatus as seen from above in the front.
Figure 15:
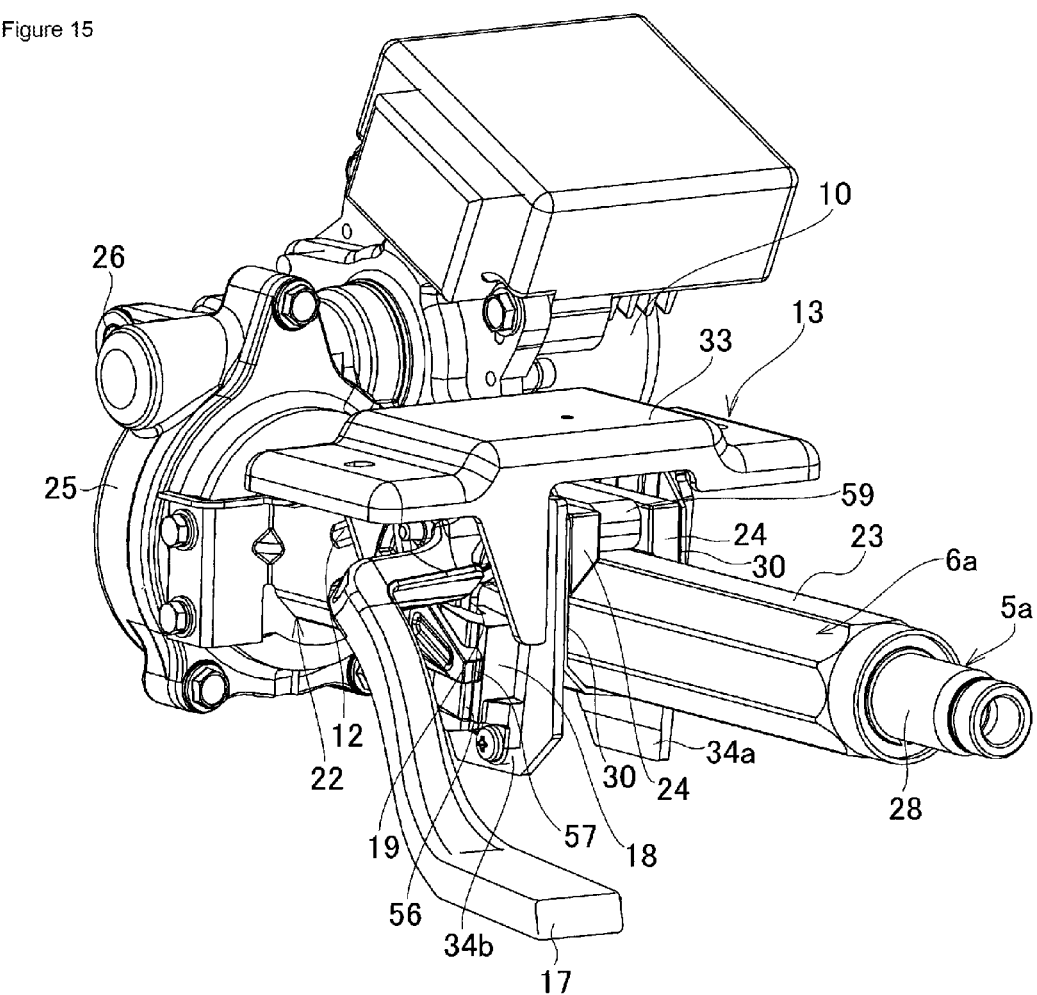
FIG. 15 is a perspective view of the construction illustrated in FIG. 14 as seen from above in the rear.
Figure 16:
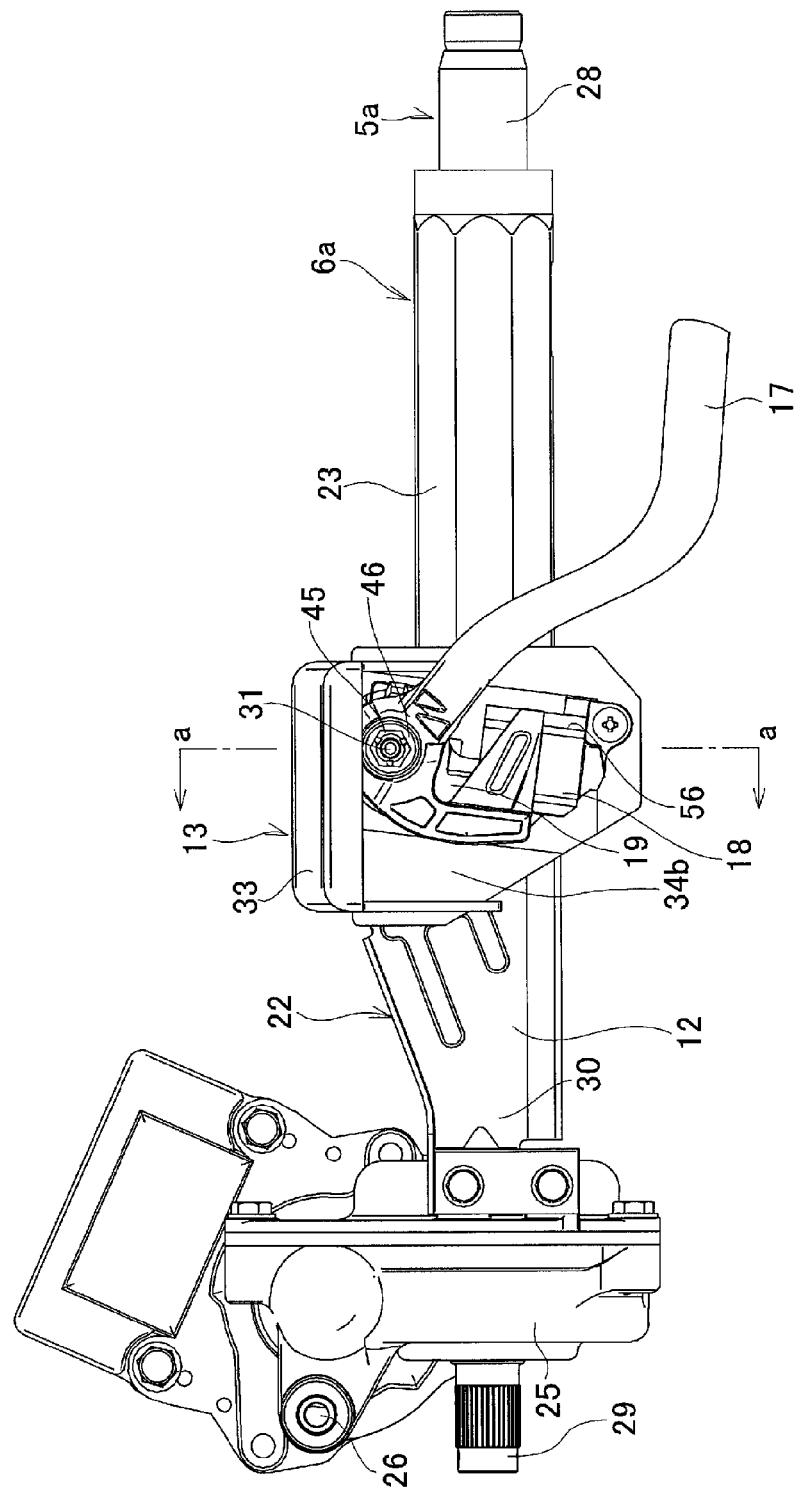
FIG. 16 is a side view of the construction illustrated in FIG. 14.
Figure 17:
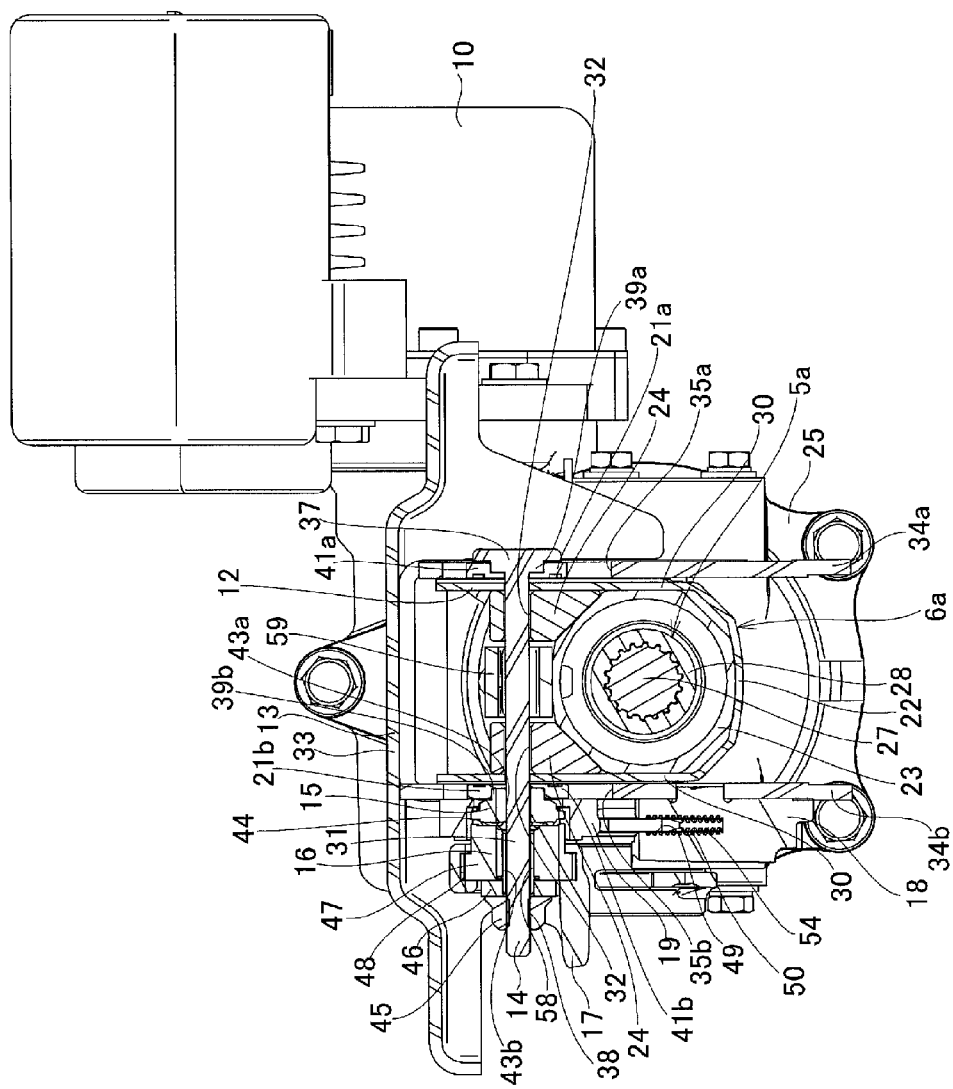
FIG. 17 is a cross-sectional view of section a-a in FIG. 16.
Figure 18:
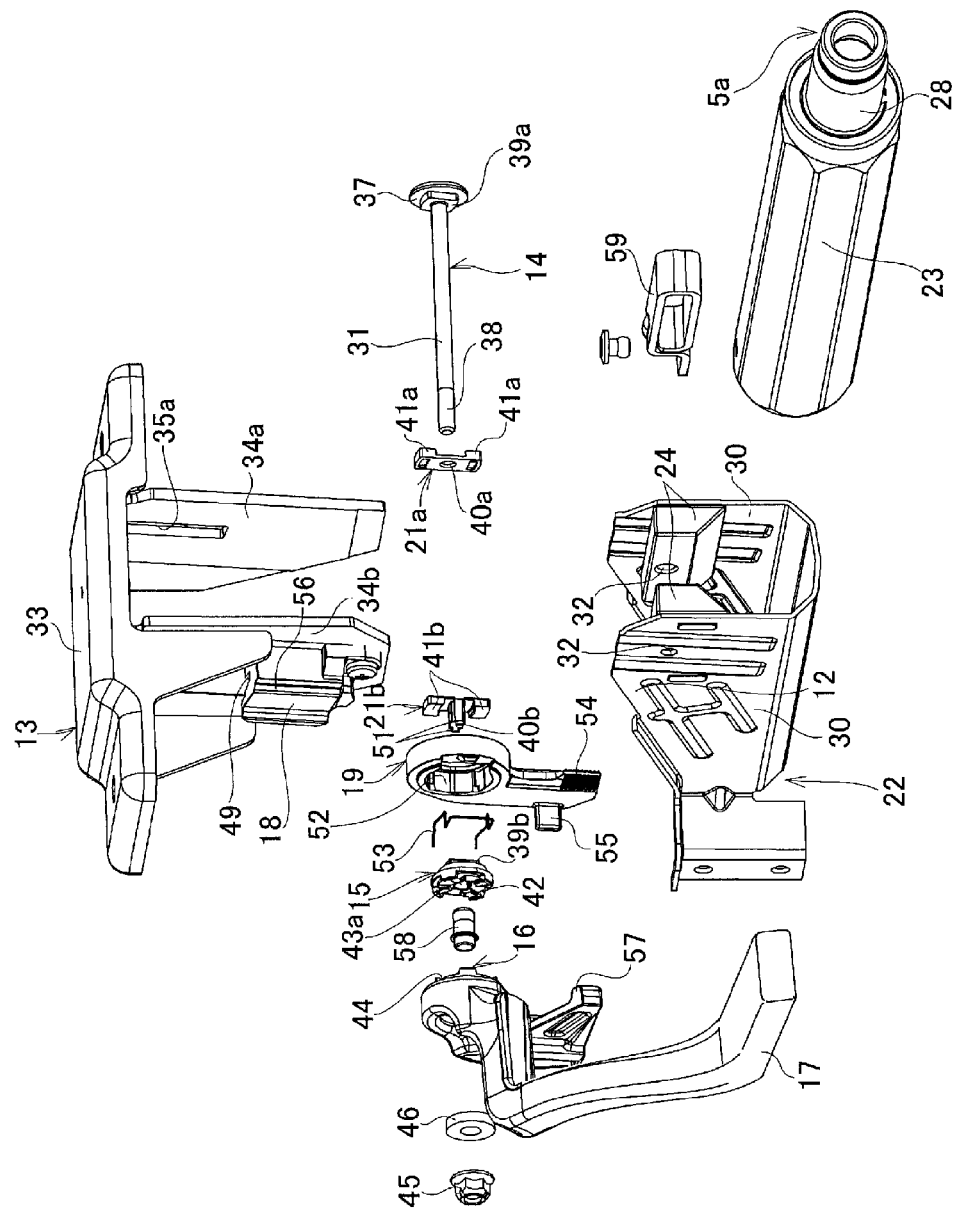
FIG. 18 is an exploded perspective view with part omitted of the construction illustrated in FIG. 14.
Figure 19:
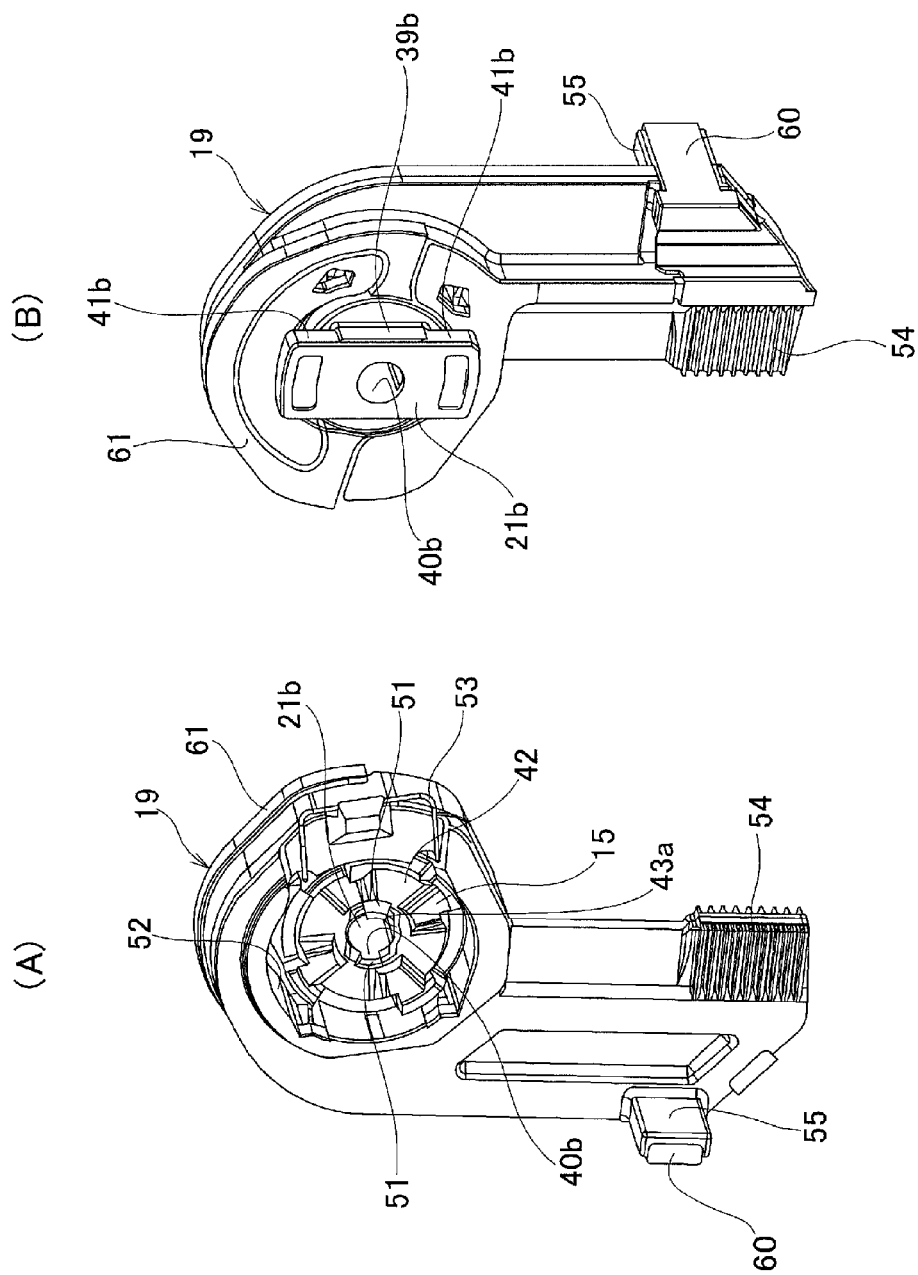
FIG. 19A is a perspective view of an example of a conventional steering apparatus, and illustrates an example of a pivot arm in which a buffer member is assembled as seen from the outside-surface side.
FIG. 19B is a perspective view of the same as seen from the inside-surface side.
Figure 20:
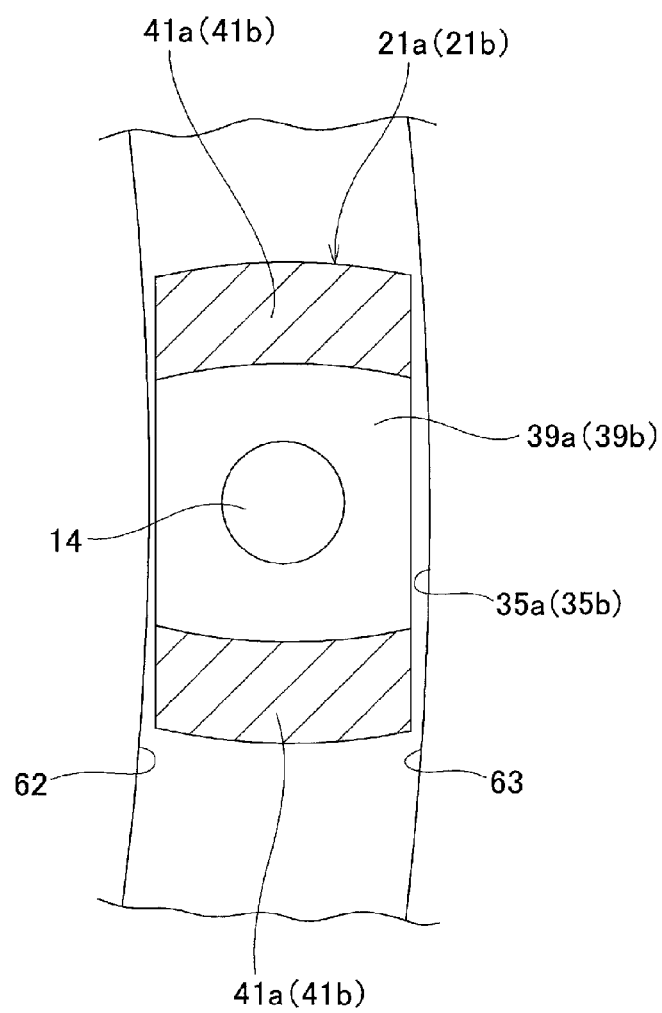
FIG. 20 is a perspective view of an example of a conventional tilt steering apparatus, and illustrates the engaged state between a vertically long hole, and the convex engaging portion and buffer member when in the free state.

FIG. 11 and FIG. 12 illustrate a third example of an embodiment of the present invention. The construction of this example is basically the same as the construction of the second example of an embodiment of the present invention, however, as in the first example of an embodiment of the present invention, low-rigidity portions 68 are provided in the four corner portions on the top and bottom and front and rear of the buffer member 21e by forming through holes 69, which correspond to the portions where material has been removed, in the inside section of both the front and rear end portions of the top hale of the buffer portion 41e on the top side, and both the front and rear end portion of the bottom half of the buffer portion 41e on the bottom side so as to pass through in the axial direction. These low-rigidity portions 68 are different from the second example of an embodiment of the present invention in that the through holes 69 as the portions where material has been removed is formed so as to pass through in the inside section thereof and that both the top and bottom end portions of the surfaces on both the front and rear sides of the buffer member 21e that correspond to the low-rigidity portions 68 protrude slightly further in the forward-backward direction than the intermediate portions in the up-down direction of the remaining portions. The construction and functions of the other parts are the same as in the tilt steering apparatus of the first and second examples of an embodiment of the present invention.

Some embodiments of the present invention were explained in detail above, however, regardless of whether or not the present invention has the detailed construction of these embodiments, a feature of the present invention is construction that achieves the prevention of the occurrence of unpleasant noise due to an impact in the direction of rotation during height adjustment of the steering wheel between a convex engaging portion that protrudes from the inside surface of the driven-side cam that rotates inside a vertically long hole and the edges on both the front and rear sides of the vertically long hole. Therefore, the present invention is constructed with the characteristic elements of the present invention that include: (1) stoppers that prevent the collision between the convex engaging portion and the front-side edge or rear-side edge of the vertically long hole when the driven-side cam is rotated accompanying the expansion or contraction of the axial dimension of the cam apparatus, and that regulate the rotation of the driven-side cam; (2) crank-shaped stepped surfaces that are provided on the convex engaging portion of the driven-side cam and on a pair of buffer portions of a buffer member; (3) cover portions that are provided in part of the buffer member and that cover portions near both the top and bottom ends of the side surfaces on at least the front side in the tightening direction of the convex engaging portion; (4) low-rigidity portions that are formed in the buffer portions of the buffer member, have a shape that covers the surfaces on both the top and bottom ends of the convex engaging portion, and has portions where material has been removed on both the front and rear end portions thereof; and (5) low-rigidity portions that protrude in the forward-backward direction from the surfaces on both the front and rear sides of the convex engaging portion, applied individually or in combinations with each other as long as there is no conflict between elements.

[Industrial Applicability]

The present invention can be widely applied to the construction of tilt steering apparatuses that have at least a manual tilt mechanism, and can be also applied to tilt and telescopic steering apparatuses that further have a telescopic mechanism for adjusting the forward-backward position of the steering wheel.

[Explanation Of Reference Numbers]
1 Steering wheel
2 Steering gear unit
3 Input shaft
4 Tie rod
5, 5a Steering shaft
6, 6a Steering column
7 Universal joint
8 Intermediate shaft
9 Universal joint
10 Electric motor
11 Housing
12 Displacement-side bracket
13 Fixed-side bracket
14 Adjustment rod
15, 15a, 15b Driven-side cam
16 Drive-side cam
17 Adjustment lever
18 Receiving bracket
19 Pivot arm
20 Pivot transmission portion 21a, 21b, 21c, 21d Buffer member
22 Outer column
23 Inner column
24 Restraining block
25 Housing
26 Support tube
27 Inner shaft
28 Outer shaft
29 Output shaft
30 Side plate portion
31 Rod portion
32 Through hole
33 Installation plate portion
34a, 34b Support plate portion
35a, 35b Vertically long hole
37 Anchor portion
38 Male screw portion
39a, 39b, 39c, 39d Convex engaging portion
40a, 40b Circular hole
41a, 41b, 41c, 41d Buffer portion
42 Driven-side cam surface
43a, 43b Through hole
44 Drive-side cam surface
45 Nut
46 Thrust bearing
47 Cam apparatus
48 Concave holding portion
49 Concave groove
50 Female gear
51 Hook-shaped piece
52 Support hole
53 Centering spring
54 Male gear
55 Protrusion
56 Locking stepped portion
57 Elastic locking piece
58 Sleeve
59 Energy-absorbing member
60 First buffer plate
61 Second buffer plate
62 Front-side edge
63 Rear-side edge
64 Convex portion-side protrusion
65 Buffer-portion-side protrusion
66 Side surface
67 Side surface
68 Low-rigidity portion
69 Through hole
70 Inclined surface portion
71 Concave portion
72 Concave hole
73 Cover portion

What is claimed is:

1. A tilt steering apparatus, comprising:
a steering column that is pivotally displaced centered around a tilt shaft that is provided in a width direction of a section on a front side thereof, and supports a steering shaft on an inside thereof such that the steering shaft can rotate freely;
a fixed-side bracket made of a metal material that is supported by a vehicle body and comprises a pair of support plate portions that hold the steering column;
vertically long holes of the steering column that are provided in positions in each of the pair of support plate portions that are aligned with each other, and that extend in the up-down direction of the steering column;
an adjustment rod that is inserted through the vertically long holes in the width direction of the steering column;
an anchor portion on a base-end portion of the adjustment rod and that engages with one of the vertically long holes that is provided in one of the pair of support plate portions so as to be able to be displaced along the one vertically long hole;
a driven-side cam made of a metal material that constitutes a cam apparatus that expands or contracts an axial dimension thereof according to rotation of the adjustment rod, that is fitted around a portion near a tip end of the adjustment rod so as to be capable of relative rotation with respect to the adjustment rod, that comprises a driven-side cam surface formed on an outside surface thereof, and a convex engaging portion formed so as to protrude from an inside surface thereof and engaging with other of the vertically long holes that is provided in other of the pair of support plate portions so as to be able to be displaced along the other vertically long hole in a state such that rotation thereof centered around the adjustment rod is suppressed; and
a buffer member that is formed using a material that is softer than the metal material of the driven-side cam and the metal material of the fixed-side bracket, and that is attached to the convex engaging portion;
stoppers being provided in at least two locations in the buffer member that are rotationally symmetric about a center axis of the adjustment rod, and the stoppers preventing collision between the convex engaging portion and a front-side edge or a rear-side edge of the other vertically long hole when the driven-side cam rotates as the axial dimension of the cam apparatus expands or contracts, and regulate the rotation of the driven-side cam;
wherein the buffer member comprises a pair of buffer portions that have shapes to cover surfaces on both top and bottom ends of the convex engaging portion, and crank-shaped stepped surfaces that match each other are formed on the surfaces of both the top and bottom ends of the convex engaging portion and on end surfaces of the pair of buffer portions that face each other so as to match each other, and the stepped surfaces of the pair of buffer portions function as the stoppers.

2. The tilt steering apparatus according to claim 1, wherein buffer-portion-side protrusions that protrude in the up-down direction are respectively provided in part in a forward-backward direction of the end surfaces of the pair of buffer portions that face each other, and convex-portion-side protrusions that protrude in the up-down direction are respectively provided in part in the forward-backward direction of the surfaces on both the top and bottom ends of the convex engaging portion, and the buffer-portion-side protrusions that come in contact with the convex-portion-side protrusions function as the stoppers.

3. The tilt steering apparatus according to claim 2, wherein the cam apparatus further comprises a drive-side cam fastened around a tip-end portion of the adjustment rod so as to be able to rotate centered around the adjustment rod and having a drive-side cam surface that is provided on an inside surface thereof so as to come in contact with the driven-side cam surface; and the convex engaging portion and the buffer member are constructed such that side surfaces of the convex-portion-side protrusions on a front side in a tightening direction of the drive-side cam, which is a rotational direction of the drive-side cam when the axial dimension of the cam apparatus is expanded, come in contact with side surfaces of the buffer-portion-side protrusions on a rear side in the tightening direction.

4. The tilt steering apparatus according to claim 2, wherein a width dimension in the forward-backward direction of the buffer-portion-side protrusions is one second or greater than a width dimension in the forward-backward direction of the end surfaces of the pair of buffer portions that face each other.

5. The tilt steering apparatus according to claim 2, wherein the surfaces on both the top and bottom ends of the convex engaging portion and the end surfaces of the pair of buffer portions that face each other are rotationally symmetric about the center axis of the adjustment rod.

6. A tilt steering apparatus comprising:
a steering column that is pivotally displaced centered around a tilt shaft that is provided in a width direction of a section on a front side thereof, and supports a steering shaft on an inside thereof such that the steering shaft can rotate freely;
a fixed-side bracket made of a metal material that is supported by a vehicle body and comprises a pair of support plate portions that hold the steering column;
vertically long holes of the steering column that are provided in positions in each of the pair of support plate portions that are aligned with each other, and that extend in the up-down direction of the steering column;
an adjustment rod that is inserted through the vertically long holes in the width direction of the steering column;
an anchor portion on a base-end portion of the adjustment rod and that engages with one of the vertically long holes that is provided in one of the pair of support plate portions so as to be able to be displaced along the one vertically long hole;
a driven-side cam made of a metal material that constitutes a cam apparatus that expands or contracts an axial dimension thereof according to rotation of the adjustment rod, that is fitted around a portion near a tip end of the adjustment rod so as to be capable of relative rotation with respect to the adjustment rod, that comprises a driven-side cam surface formed on an outside surface thereof, and a convex engaging portion formed so as to protrude from an inside surface thereof and engaging with other of the vertically long holes that is provided in other of the pair of support plate portions so as to be able to be displaced along the other vertically long hole in a state such that rotation thereof centered around the adjustment rod is suppressed; and
a buffer member that is formed using a material that is softer than the metal material of the driven-side cam and the metal material of the fixed-side bracket, and that is attached to the convex engaging portion;
wherein stoppers are provided in at least two locations in the buffer member that are rotationally symmetric about a center axis of the adjustment rod, the stoppers preventing collision between the convex engaging portion and a front-side edge or a rear-side edge of the other vertically long hole when the driven-side cam rotates as the axial dimension of the cam apparatus expands or contracts, and regulate the rotation of the driven-side cam; and
the cam apparatus further comprises a drive-side cam fastened around a tip-end portion of the adjustment rod so as to be able to rotate centered around the adjustment rod and having a drive-side cam surface that is provided on an inside surface thereof so as to come in contact with the driven-side cam surface; and cover portions that cover portions near both the top and bottom ends of at least side surfaces on a front side of both side surfaces of the convex engaging portion in a tightening direction of the drive cam, which is a rotational direction of the drive-side cam when the axial dimension of the cam apparatus is expanded, prevent abutment between the portions near both the top and bottom ends of the side surfaces on the front side and inside edges on the front side of the vertically long hole, and functions as the stoppers, are provided in part of the buffer member.

7. The tilt steering apparatus according to claim 6, wherein the buffer member comprises a pair of buffer portions that cover the surfaces on both the top and bottom ends of the convex engaging portion; and the cover portions extend in the up-down direction from at least end portions on the front-side in the tightening direction of the pair of buffer portions.

8. The tilt steering apparatus according to claim 7, wherein concave portions are formed on both the top and bottom ends of surfaces on both front and rear sides of the convex engaging portion; a width dimension in the forward-backward direction of both the top and bottom end portions of the convex engaging portion is narrower than a width dimension in the forward-backward direction of an intermediate portion in the up-down direction of the convex engaging portion;
the cover portions extend in directions toward each other from both front and rear end portions of the pair of buffer portions, and engage with the concave portions; and
both side surfaces in the forward-backward direction of the intermediate portion in the up-down direction of the convex engaging portion do not protrude further in the forward-backward direction than the cover portions.

9. A tilt steering apparatus comprising:
a steering column that is pivotally displaced centered around a tilt shaft that is provided in a width direction of a section on a front side thereof, and supports a steering shaft on an inside thereof such that the steering shaft can rotate freely;
a fixed-side bracket made of a metal material that is supported by a vehicle body and comprises a pair of support plate portions that hold the steering column;
vertically long holes of the steering column that are provided in positions in each of the pair of support plate portions that are aligned with each other, and that extend in the up-down direction of the steering column;
an adjustment rod that is inserted through the vertically long holes in the width direction of the steering column;
an anchor portion on a base-end portion of the adjustment rod and that engages with one of the vertically long holes that is provided in one of the pair of support plate portions so as to be able to be displaced along the one vertically long hole;
a driven-side cam made of a metal material that constitutes a cam apparatus that expands or contracts an axial dimension thereof according to rotation of the adjustment rod, that is fitted around a portion near a tip end of the adjustment rod so as to be capable of relative rotation with respect to the adjustment rod, that comprises a driven-side cam surface formed on an outside surface thereof, and a convex engaging portion formed so as to protrude from an inside surface thereof and engaging with other of the vertically long holes that is provided in other of the pair of support plate portions so as to be able to be displaced along the other vertically long hole in a state such that rotation thereof centered around the adjustment rod is suppressed; and
a buffer member that is formed using a material that is softer than the metal material of the driven-side cam and the metal material of the fixed-side bracket, and that is attached to the convex engaging portion;

wherein stoppers are provided in at least two locations in the buffer member that are rotationally symmetric about a center axis of the adjustment rod, the stoppers preventing collision between the convex engaging portion and a front-side edge or a rear-side edge of the other vertically long hole when the driven-side cam rotates as the axial dimension of the cam apparatus expands or contracts, and regulate the rotation of the driven-side cam; and wherein the buffer member comprises a pair of buffer portions that have shapes to cover the surfaces on both the top and bottom ends of the convex engaging portion, and that respectively have low-rigidity portions that are formed by portions of which material has been removed and are formed in both the front and rear portions thereof; and the low-rigidity portions protrude further in the forward-backward direction than the surfaces on both the front and rear sides of the convex engaging portion, and in a neutral state in which no rotation force in a direction that expands the axial dimension of the cam apparatus is applied, only the low-rigidity portions come in elastic contact with edges on both front and rear sides of the vertically long hole.

* * * * *